(12) United States Patent
Denker et al.

(10) Patent No.: US 12,293,426 B2
(45) Date of Patent: *May 6, 2025

(54) SYSTEMS AND METHODS FOR CONTRACT NEGOTIATION AND DRAFTING

(71) Applicant: Transactency LLC, St Charles, IL (US)

(72) Inventors: Michael Denker, St. Charles, IL (US); Joseph Brennan, Highland Park, IL (US)

(73) Assignee: Transactency LLC, St. Charles, IL (US)

(*) Notice: Subject to any disclaimer, the term of this patent is extended or adjusted under 35 U.S.C. 154(b) by 268 days.

This patent is subject to a terminal disclaimer.

(21) Appl. No.: 18/109,686

(22) Filed: Feb. 14, 2023

(65) Prior Publication Data

US 2023/0186419 A1 Jun. 15, 2023

Related U.S. Application Data

(63) Continuation of application No. 16/040,499, filed on Jul. 19, 2018, now Pat. No. 11,580,611.

(Continued)

(51) Int. Cl.
| | |
|---|---|
| G06Q 50/18 | (2012.01) |
| G06F 3/0482 | (2013.01) |
| G06F 40/131 | (2020.01) |
| G06F 40/171 | (2020.01) |
| G06F 40/186 | (2020.01) |

(52) U.S. Cl.
CPC ......... *G06Q 50/188* (2013.01); *G06F 3/0482* (2013.01); *G06F 40/131* (2020.01); *G06F 40/171* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 6,502,113 | B1 * | 12/2002 | Crawford | G06Q 10/10 |
| | | | | 715/251 |
| 7,069,234 | B1 * | 6/2006 | Cornelius | G06Q 40/00 |
| | | | | 705/26.8 |

(Continued)

OTHER PUBLICATIONS

G. Visinari and A. Groza, "Building an E-contract management system using Google Docs," 2011, 2011 IEEE 12th International Symposium on Computational Intelligence and Informatics (CINTI), pp. 225-230 (Year: 2011).*

(Continued)

*Primary Examiner* — Sarah M Monfeldt
*Assistant Examiner* — Michael J. Monaghan
(74) *Attorney, Agent, or Firm* — K&L Gates LLP

(57) ABSTRACT

The systems and methods herein provide a user-friendly, automated and transparent, contract drafting and negotiation tool. Through the contract drafting and negotiation tool two parties can negotiate agreement using template agreements including one or more sections in which each user is able to select one of a plurality of input options that affect the terms of the contract. In each instance, each party can see the option selected by the other party, as well as the options not selected by the other party. The systems and methods facilitate efficient and transparent contract negotiation and drafting.

15 Claims, 21 Drawing Sheets

Related U.S. Application Data

(60) Provisional application No. 62/534,513, filed on Jul. 19, 2017.

(56) References Cited

U.S. PATENT DOCUMENTS

| | | | | |
|---|---|---|---|---|
| 8,065,202 | B1* | 11/2011 | Ballaro | G06Q 30/0643 |
| | | | | 705/27.2 |
| 10,552,525 | B1* | 2/2020 | Allison | G06Q 10/10 |
| 2003/0074633 | A1* | 4/2003 | Boulmakoul | G06Q 10/0875 |
| | | | | 715/256 |
| 2006/0010377 | A1* | 1/2006 | Anecki | G06Q 10/10 |
| | | | | 715/255 |
| 2006/0287966 | A1* | 12/2006 | Srinivasaraghavan | |
| | | | | G06Q 10/10 |
| | | | | 705/1.1 |
| 2007/0078789 | A1* | 4/2007 | Griffit | G06Q 50/188 |
| | | | | 705/1.1 |
| 2009/0281853 | A1* | 11/2009 | Misvaer | G06Q 50/18 |
| | | | | 715/708 |
| 2012/0016943 | A1* | 1/2012 | Greenberg | G06Q 10/10 |
| | | | | 709/206 |
| 2012/0310790 | A1* | 12/2012 | Curd | G06Q 10/063 |
| | | | | 715/781 |
| 2014/0164255 | A1* | 6/2014 | Daly | G06Q 10/0631 |
| | | | | 705/80 |
| 2015/0220501 | A1* | 8/2015 | Pickles | G06F 40/143 |
| | | | | 715/234 |
| 2017/0068406 | A1* | 3/2017 | Mark | G06F 3/04886 |
| 2018/0239959 | A1* | 8/2018 | Bui | G06F 16/93 |

OTHER PUBLICATIONS

P. R. Krishna and K. Karlapalem, "Electronic Contracts," 2008, IEEE Internet Computing, vol. 12, No. 4, pp. 60-68 (Year: 2008).*

* cited by examiner

Create New Contract

Receiving Party Info
Please enter receiving party information.

Patrick

Please select type
- ◉ Individual —156
- ○ Business

Please type name
P. Duffy —158

Please type address
123 Main St. —160

Please type email address
pduff31@gmail.com —162

Cancel | Back     Create Contract

FIG. 6

| Demo
176 — | 198  186
16  Start Date
      What date would you like this agreement to become effective?
      07/19/2018
      182         184       178         168    170    180       174  172
                            EZ-CHOOSE                              Patrick
190 — 👁
192 — ❓
188

This Agreement may be executed in any number of counterparts and by different parties hereto in separate counterparts, each of which when so executed shall be deemed to be an original and all of which when taken together shall constitute one and the same instrument. One or more counterparts of this Agreement may be delivered via facsimile with the intention that they shall have the same effect as an original executed counterpart hereof.

IN WITNESS WHEREOF, this Agreement has been executed by parties to become effective as of 07/19/2018.     194 ✉

SENDER: _____     RECEIVER: _____

By: _____          By: _____

Printed: Patrick Richards            Printed: P. Duffy

Printed: Owner                       Address: 123 Main St.

Printed: patrick@richardspatentlaw.com    Printed: pduff31@gmail.com ( Save Contract )   ( Send Contract )
     202              204

« Prev          3 of 19          Next »
                                  196

FIG. 8

Business Purpose

Please define the business purpose for your exchange of information. Your agreement will limit both parties' use of confidential information to the "Opportunity" that the parties have selected.

◉ The ongoing provision of goods and/or services by one party to the other

○ The provisio of investment capital by one party to the other

○ Assisting in research, development, and/or launch of a party's products and/or services ○ An as-yet undetermined and potential business « Prev    4 of 19    Next »

This Confidentiality and Non-Disclosure Agreement (the "Agreement") is entered into as of the date set forth on the signature page hereto (the "Effective Date"), by and between Richards Patent Law P.C. a(n) Illinois Corporation having offices located at 233 S. Wacker Dr., 84th Floor ("Initiator"), on the one hand, and the individual or entity set forth on the signature page hereto under the heading "Other Party" (the "Other Party"), on the other hand. Whereas, Initiator has entered into preliminary discussions with the Other Party concerning the ongoing provision of goods and/or services by one party to the other (the "Opportunity"). Whereas, to assist the parties in continuing to evaluate the Opportunity, each party is prepared to make available to the other certain business, financial, and technical information which each regards as proprietary and confidential and Whereas, each party is willing to furnish such information to the other, and the other is willing to receive such information, on the terms and conditions set forth below. Now, therefore, the parties hereto agree to the foregoing and as follows:

1. DEFINITIONS.

1.1. Trade Secrets.

"Trade Secrets" shall mean information related to the business of a party that derives economic value, actual or potential, from not being generally known to or readily ascertainable by other persons who can obtain economic value from its disclosure or use and is the subject of efforts by such party that are reasonable under the circumstances to maintain its secrecy. Without limiting the generality of the foregoing, each party acknowledges and agrees that the other party's business plans, offerings, forecasts, methods, and practices, and technologies relating to same, constitute Trade Secrets of the other party as such plans, offerings, forecasts, methods, and practices derive economic value, actual or potential, from not being generally known to or readily ascertainable by

FIG. 9

| Demo | 〇 Patrick ⌄ |
|---|---|

CONTRACT OVERVIEW
19 Total Issues

- Initiating Party Info
- Receiving Party Info
- Start Date
- Business Purpose
- Securities Law Provisions
- Marking Requirement
- Burden of proof
- Representatives

[ 0 ]

Compensation for Assistance

If the receiving party is required to assist the disclosing party in keeping the disclosing party's Proprietary Information from being disclosed as a result of a subpoena or other instrument, should the receiving party be compensated?

○ Yes
⦿ No statements associated with the Proprietary Material when received.

12. AMENDMENTS, ETC.

No modification, amendment, or waiver of any provision of this Agreement shall be effective unless the same shall be in writing and signed by each of the parties hereto. Any waiver of any provision of this Agreement shall be effective only in the specific instance and for the specific purpose for which given.

13. NO WAIVER; REMEDIES.

No failure on the part of a party to exercise, and no delay in exercising, any right, power, or privilege hereunder shall operate as a waiver thereof, nor shall any single or partial exercise of any right hereunder preclude any other or further exercise thereof or the exercise of any other right. The remedies herein provided are cumulative and not exclusive of any remedies provided by law.

14. GOVERNING LAW; JURISDICTION AND VENUE

This Agreement shall be governed by, and construed in accordance with, the laws of the state of Illinois (not including any conflict of law provisions of the state of Illinois) and no action involving this Agreement may be brought except in the state court located in (and the federal court in closest geographical proximity to) the county of residence (if an individual) or of the primary office (if a (EZ-CHOOSE)

« Prev    12 of 19    Next »

(Save As Template)    (Save Contract)    (Send Contract)

(End Negotiations)

Confidentiality and Non-Disclosure Agreement

This Confidentiality and Non-Disclosure Agreement (the "Agreement") is entered into as of the date set forth on the signature page hereto (the "Effective Date"), by and between Richards Patent Law P.C., a(n) Illinois Corporation having offices located at 233 S Wacker Dr., 84th Floor ("Initiator"), on the one hand, and the individual or entity set forth on the signature page hereto under the heading "Other Party" (the "Other Party"), on the other hand. Whereas, Initiator has entered into preliminary discussions with the Other Party concerning the ongoing provision of goods and/or services by one party to the other (the "Opportunity"). Whereas, to assist the parties in continuing to evaluate the Opportunity, each party is prepared to make available to the other certain business, financial, and technical information which each regards as proprietary and confidential; and Whereas, each party is willing to furnish such information to the other, and the other is willing to receive such information, on the terms and conditions set forth below. Now, therefore, the parties hereto agree to the foregoing and as follows:

1. DEFINITIONS.

1.1. Trade Secrets.

"Trade Secrets" shall mean information related to the business of a party that derives economic value, actual or potential, from not being generally known to or readily ascertainable by other persons who can obtain economic value from its disclosure or use and is the subject of efforts by such party that are reasonable under the circumstances to maintain its secrecy. Without limiting the generality of the foregoing, each party acknowledges and agrees that the other party's business plans, offerings, forecasts, methods,

Initiating Party Info

Please select type
○ Individual
◉ Business

Insert Full Company Name
Richards Patent Law P.C.

Please select business type
[Corporation ▼]

Demo    P. Duff    EZ-AGREE    Sign Contract    Next ▶    1 of 19

FIG. 20

TRANSACTENCY

114 — Contracts
116 — ☐ Templates

Search in contracts... 🔍

& P. Duff

112

☐ Create Contract — 118

| Name ⬍ 120 | Other Party ⬍ 122 | Type ⬍ 124 | Status ⬍ 126 | Issues ⬍ 128 | Active Party ⬍ 130 | Last Shared ⬍ 132 |
|---|---|---|---|---|---|---|
| Demo NDA | Patrick Richards | NDA | Awaiting PDF | - | - | 07/14/2018 ⬇ 🔍 |

FIG. 21

SYSTEMS AND METHODS FOR CONTRACT NEGOTIATION AND DRAFTING

CROSS-REFERENCE TO RELATED APPLICATIONS

This application comprises a continuation application claiming priority to U.S. patent application Ser. No. 16/040,499 filed Jul. 19, 2018, which claims the benefit of priority to U.S. Provisional Patent Application No. 62/534,513 filed Jul. 19, 2017, the disclosures of which are incorporated by reference herein.

BACKGROUND OF THE INVENTION

The present subject matter relates generally to systems and methods of contract negotiation and drafting. More specifically, the present subject matter provides a user-friendly, automated and transparent, contract drafting and negotiation tool.

Contracts are the backbone of business relationships. From simple real estate leases to complex service agreements, licenses, and asset purchase agreements, contracts govern nearly every business transaction. However, getting to an executed contract is rife with problems. The legal costs consume and sometimes eclipse the deal value. The time it takes to contract can bring deals to a halt. A lack of focus on the matter can lead to further delays and inefficiencies. Disparities between the talent and experience of the parties and their attorneys can lead to uneven playing fields and less than optimal agreements. There is a lack of standardization in the industry, which often makes each deal a custom one-off project, further increasing the costs and delays. In addition, because the parties themselves often need explanation of the terms that should be in the contract to meet their needs, there can be a loss of control as the business people are forced to rely on the attorneys to explain the terms and to complete the contract.

On top of all of these concerns, contracts are the written embodiments of a relationship between two parties and the best relationships require trust. Trust between each of the parties is often difficult to foster in the traditional contract negotiation process. Transparency in the process of negotiating and drafting the contact can help to improve the trust between the parties and improved trust leads to improved relationships. Accordingly, there is a need for a contract drafting and negotiation tool that improves the transparency of the contract negotiation and drafting process.

At the consumer level, contract law is typically considered one of the more accessible fields of law. Purposefully formulated with what most would consider common sense rules, the uniform commercial code (UCC) and state level contract laws codify the rules that surround contracting for almost everything in modern society. However, contract formation, even for the most basic of deals, is still more complicated than typical laymen can understand and results in a great number of flawed (sometimes fatally) business deals when legally unsophisticated individuals attempt to form a contract on their own. Accordingly, there is a need for systems and methods that enable consumers to more easily negotiate and draft quality contracts.

The inability for average individuals, small business, or even sophisticated companies to easily negotiate and draft a contract results in many issues, with the biggest issue often being the time and expense it takes to form a contract. Many unsophisticated parties are turned off by the time and expense of negotiating and drafting a contract, resulting in instances where people choose to just "risk it" instead of creating a formal contract. This is not an ideal result. The choice to, for example, rent an apartment without a formal contract can be ill-advised for many reasons. Instead of the "risk it" approach, some less sophisticated parties choose to use form contracts filled with generic boilerplate language. In these instances, it is uncommon for the form contract to truly reflect the agreement between the parties. These form contracts are typically not much more than a simple template with stock language and lack any significant customization. It is typically no more valuable that one would expect from a contract drafted by someone with no insight into the parties' present situation. Accordingly, there is a need for systems and methods that enable easy negotiation and drafting of contracts based on customizable forms that adapt to the parties' needs.

Contract negotiation and drafting can also be problematic for more sophisticated parties. Large organizations may enter in hundreds, or thousands, of similar contracts with third-parties. Inconsistency in these contracts can be problematic in that it can lead to varied obligations to each of the many third-parties. A given organization may have multiple attorneys negotiating and drafting these agreements, which, even given an organization wide playbook, may result in unintentional inconsistencies. It may also require individual approval of language in each contract, which requires the parties to prepare an initial draft of a contract, review and revise the contract while highlighting proposed edits (e.g., redlining, track changes, etc.), and exchanging the contract with the other party, often for several rounds of back and forth editing. This process consumes a great deal of resources and introduces a very high possibility of errors, miscommunications, and is even frustrating for attorneys (or legal support personnel) who are forced to meticulously review such documents. Accordingly, there is a need for contract negotiation and drafting systems and methods that improve consistency and reduce review and approval time and resources.

For the reasons provided above, and more, there is a need for systems and methods of agreement negotiation and drafting as provided herein.

BRIEF SUMMARY OF THE INVENTION

To meet the needs described above and others, the present disclosure provides systems and methods of agreement negotiation and drafting. More specifically, the present subject matter provides a user-friendly, automated and transparent, contract drafting and negotiation tool. The system is intended to modernize the contract creation and negotiation process, with the ultimate goal of making transparency and understanding in negotiation of legal terms the de facto standard for doing business. When utilizing the present system, contracting parties are able to reach agreement on contracts more simply, quickly, directly, and on a more informed basis, all at far less cost than was previously available.

The features and functions of the system described herein are provided to users through one or more graphical user interfaces (GUIs). The GUIs are accessed by the users through one or more end user devices. Typical end user devices include smartphones, tablets, laptops, personal computers, kiosks, etc. In a typical embodiment, the one or more programs providing the GUIs to the users are hosted in a cloud server. The cloud server includes one or more controllers in communication with memory including instructions that, when executed, cause the one or more controllers to perform the various functions described herein. The memory in communication with the controller is further used to store one or more structured data sets, for example in a database. For example, the various contracts and contract templates described herein may be stored in a database in the memory such that they are accessible to users through their end user devices. It is understood that the specific structure described above is merely one example of a structure that may be used to host and deploy the system described herein.

The present system provides a tool that enables simplified and efficient contract negotiation and drafting. In a preferred embodiment, the tool includes one or more contract templates that parties may use to easily reach a negotiated contact that accurately reflects the both parties' intentions. In use, a first party (initiating party) logs into the system and selects a contract template to use as a basis of the agreement. The initiating party is then presented a series of questions that either request information to be input (names, addresses, dates, etc.) or request the user to select one of multiple predetermined options. Each time the initiating party inputs information into the system, the contract template is updated with the user selection such that the initiating party sees exactly how the selection affects the contract. The tool walks the initiating party through the series of questions to create the initial draft of the agreement in a linear, but dynamic path (i.e., each choice in the progression may branch to a new line), the tool filing in the template agreement with each answered question. Once each of the questions is answered, the initiating party is given the finalized draft to review, save, and send to the second party (receiving party).

One of the key advantages of the system is that it allows users to input "business terms" pertinent to the transaction in response to queries posed by the system which are then translated, by the system, into enforceable contract provisions. The associated contract (which the user views in real-time) "grows" in response to the user's selections as the questions are answered. If the user desires, the user can include comments along with the selections (e.g., that the provision is non-negotiable due to corporate policy). The comments are provided to the other party to help the negotiation proceed.

When the receiving party receives the initial draft, the receiving party is able to see: (1) the initial draft; (2) the series of questions asked of the initiating party; (3) the answers given/selected by the initiating party; (4) the answers NOT selected by the initiating party; and (5) specifically how the answers given affected the drafting of the agreement. The receiving party is then able to accept each selection or propose a different input/selection. The receiving party walks through each question/selection approving, putting the issue on hold, or providing an alternative response for each question. Each alternative response provided revises, in real-time, the legal provisions corresponding to the user's selection. In a preferred embodiment, not putting an issue on hold or providing an alternative answer is all that is required to accept/approve a given contract term. Once the receiving party has completed the review/edits, the receiving party saves the agreement and makes it available to the initiating party.

Each side goes back and forth exchanging revised drafts until agreement is reached on each point and the document is ready for signature by each party. At each stage, the agreement shows what each party has input/selected and highlights the sections of the agreement that are not yet agreed upon. This enables the parties to very efficiently focus on the points that need further negotiation. It also shows each party what predetermined options are available to the other, so it is clear what options each is forgoing to select the option it has. To preserve tight version control during the negotiation process, only one party is enabled editing privileges at a time, but either party is able to view the most recent version of the contract at any time.

The back-and-forth, transparent process iterates until the contract is completed or abandoned. If the contract is successfully completed, the system enables electronic execution of the agreement and disseminates executed copies to the parties, while retaining a copy in each user's account. If the agreement is abandoned, the system distributes the work-in-progress contract, as well as the equivalent of a mediation report, that identifies the history of the negotiations, the items that were agreed upon, and the items that remained "open" as of the time of abandonment.

In a preferred embodiment, a counter is provided showing each party how many open issues are left to be resolved before the agreement is ready for signature. In the initial draft by the initiating party, the counter starts at the maximum number for a given template and counts down to zero as the initiating party answers each question. When the counter reaches zero, the contract can be sent to the receiving party. Each contract term for which the receiving party puts an issue on hold or offers a different input/selection increases the counter from zero. When the receiving party sends the contract back to the initiating party, the counter will clearly indicate how many terms must be resolved before the contract is ready for signatures. This counter indicates the open issues between the parties all the way until the completion of the negotiation and makes it very easy for each side to focus on the outstanding issues.

For example, in one example of the system, the counter is provided on screen and the selection of the counter by either party brings up a summary screen of the contract issues. In the summary screen, each contract term for which the parties are given an opportunity to negotiate is provided in a numbered list. Each term is indicated as agreed or open by a small symbol next to the term. For example, a check mark may be used to signal an agreed term, two parallel vertical lines (the pause symbol) may signal the issue is on hold, and two parallel arrows pointing in opposite directions may be used to indicate the issue is still being negotiated.

There are three main views available to the initiating party and the receiving party throughout the negotiation process; a detail view, a summary view, and a contract view. In the detail view, the user is able to see the list of issues (open and resolved), the question and selected inputs related to a given issue, and the manner in which the contract is affected by the selection made with respect to the given issue. The selections and the effect on the contract can each be color coded as to indicate which party made the selection (e.g., initiating party is purple and receiving party is green). In the summary view, the issues are provided in a numbered sequence with each party's color-coded selection and any related comments dated such that the parties can quickly see the current status of each issue, as well as the history or the negotiations for each issue. In the contact view, the contract itself fills the screen and the user can scroll through the contract, select any highlighted section (each section with adjustable terms is highlighted), and be taken to the detail view related to that section's issue.

Throughout the negotiation process, additional information may be available to each party to assist each in understanding the terms and options available within the agreement. For example, if one of the parties needs background information as to the meaning of a particular contract provision or the rationale as to why it is negotiable, the party may click on a hyperlink provided by the system to obtain further information on a given point.

As shown, the process provided by the system greatly improves the efficiency and transparency of the negotiation process. The template options enable the parties to create customized contracts that truly match their agreement, while maintaining coherency and consistency in their final drafts.

Although it is contemplated that the system described herein can be embodied in many forms, more detailed examples are provided below to expand the summary description of the system.

A user dashboard is provided for each user to manage the user's assets in the system. In one example, the dashboard provides a dropdown menu identifying the various contracts that are available for creation and negotiation. The dashboard also lists all of the contracts to which the user (or, the user's company) is a party, and delineates which of these have been executed and which are in the progress of being negotiated. When a contract is in the process of being negotiated, the dashboard indicates which party is then-engaged in analysis (i.e., the party whose court the ball is in—as only one party may interact with the system at a time). The list includes various data fields relative to each contract, such as party name, property address (if the contract is a lease), execution date, termination date, etc. The dashboard may also include a drop-down menu of the templates that a party has access to use, including any templates the party has previously created and saved for future use (e.g., the user's standard template for a triple-net office lease).

When a user wants to view an executed contract, the user clicks on the particular contract to view (and print, if desired) a .pdf of the fully-executed agreement. If a user wants to interact with a contract that is in the negotiation phase, the user can click on the subject contract and be taken into the detail view (described further herein). If the user wants to create a new contract using a previously-saved template (e.g., partially completed form contract), the user can select the desired template from the template drop-down menu and be taken to the contract build mode (described below). Finally, if the user wants to create a new contract without the aid of a previously-designed template, the user may choose the desired contract from the contract drop-down menu and commence building the contract.

The contracts available in the system may be provided by the system administrators, may be built and uploaded by the end users, and/or may be provided by third-parties. It is contemplated that the system described herein may be a platform in which the legal community builds and shares form agreements that greatly improve the efficiency and efficacy of the contract negotiation market. Accordingly, a contract custom built by a given party may find a commercially marketable use in being licensed or sold to other users of the platform.

In many instances, a user's primary initial interaction with the system is through building one or more contracts. To build a contract, the user first selects the type of contract to be built from the contract drop-down menu (e.g., an office lease, a non-disclosure agreement, an independent contractor agreement, etc.). Upon selection, the user is taken to a new page where the user is provided a welcome message identifying the type of contract chosen to be built with a summary of the steps to build the contract. Upon acknowledging same, the user is directed to enter information identifying the parties to the contract (each of which is labelled with a distinct color), their respective company name (or, if an individual, the individual's name), address, city, state, zip code, telephone, and email. This step is carried out in what is referred to as the party identification page. After providing the parties' information, the user is prompted with a "next" button to proceed further.

Upon clicking "next", the user is taken to a new page where the user is prompted to complete fields for all of the business terms that apply to the transaction. For example, for real estate transactions, the user may be asked to identify as a broker, a landlord, or a tenant (as this will affect how the open session proceeds—particularly where a broker initiates the open session). Business terms will vary depending upon the nature of the underlying contract. By way of example, if the underlying agreement is a lease, it would include, among others, fields for property address, city, state, zip code, square footage, permitted uses, initial term, CAM percentage, security deposit amount, base rent, and additional rent. Once the user has completed all business term fields, the user will be queried as to whether he or she wants to create a letter of intent or a contract.

It is contemplated that the initial details provided by the initiating user may vary considerably from one contract to the next. In some instances, there will be significant detail required about the parties, in other instances there may be significant detail needed about the basic terms of the agreement.

It is contemplated that in some embodiments, the system may be used to form either letters of intent or contracts. In such systems, when the user opts to create a letter of intent, the system generates a non-binding letter of intent, incorporating the party information and business terms previously inputted by the user. After building the initial draft of the letter of intent, the user will be able to invite the other party into an open session to negotiate the terms of the letter of intent, as further described below.

When the user opts to create a contract (or, a letter of intent was previously chosen and successfully negotiated to signature within the system), the user is taken to a new page to build the contract. The user is advised via sequential notes of the following: (1) that the system will query or otherwise obtain information in four different formats: (a) free-form text entry; (b) yes/no selections; (c) multiple choice; and (d) choose all that apply; (2) that the user can supplement any input with comments that will be provided to the other party; (3) that, if the user needs to learn more about a particular issue, the user can click a hyperlink that will open a page providing further education on the matter; and (4) that the user will be able to review his or her choices before the contract is provided to the other party. Upon completing the final informational note, the user is taken to the legal build view.

In a preferred embodiment of the legal build view, the screen includes a colored banner, the upper right corner of which identifies the user by name and indicates the user's associated color (e.g., blue). In the upper left corner of the banner, the particular contract is identified (e.g., for a lease, with the other party's name and the property address). In the center of the banner is an "EZ-CHOOSE" button, the function of which is described in greater detail herein. Below the banner, the screen is split in two vertically divided windows (the margin of which may be dragged left or right to increase one side of the screen and correspondingly shrink the other).

On the right side is the in-progress contract, and the user may scroll through the contract to see the language of the contract as it exists. This access is provided before, during, and after the user inputs the requested data.

On the left side is a heading identifying the subject matter of the first query to be made to the user. Below the heading is a question to the user as to a legal issue (e.g., for a lease, "Will you require the tenant to provide you with annual financial statements?").

Above and to the right of the heading is a notation icon. If a user clicks on the notation icon, a box opens inviting the user to provide comments or other communications the user would like to make to the other party relating to the issue at hand. Upon providing any comments, the user is advised that the time-stamped comment will be provided to the other party.

Below the query is a hyperlink for additional information about the specific issue at hand. When a user clicks on the hyperlink, a box opens on the page containing further information about the subject—e.g., an explanation of why this item is a negotiable issue and what the issue means in plain-language.

Below the question are the options that may be chosen by the user in response to the query: if it is a question that requires a typewritten response, space to type the response; if it is a yes/no question, buttons for each of "yes" and "no"; if it is multiple choice; buttons and corresponding language describing the various options; if it is a question where the user may choose some or all of the options, boxes to check and corresponding language describing the various options.

Upon inputting a response to the query, the right side of the screen (the contract half) immediately scrolls to the area of the contract that relates to the query, and the legal language corresponding to the input provided is generated, inserted, and highlighted with the color associated to the party (e.g., blue).

If the user has included a comment with the selection, an envelope icon, along with a marking in the associated color (blue), is set forth in the right margin next to the highlighted text.

The user may, on the same screen and without proceeding further, provide alternative input (e.g., select a different choice in response to the query); the legal language corresponding to the input provided is simultaneously generated, inserted, and highlighted with the color associated to the party (e.g., blue) on the right side of the screen (the contract half). The user can do this as many times as he or she likes—that is, the user can review the legal language that is associated with the choice in every instance (though the user is not required to do so and can rely on the high-level description set forth on the left side of the screen).

Once a user is satisfied with the selection, the user saves the selection and, upon doing so, the left side of the screen moves to the next query. The process repeats until the user has answered all of the queries generated by the system.

Upon answering the final query, the left side of the screen (query half) changes to the summary view. In summary view, each question that was posed to the user is listed along with the answer the user provided and highlighted the user's color. The questions and answers are all on one, scrollable page, with the options to send to the other party or save the draft as a template available to the user. For example, these actionable options may be available at the bottom of the GUI regardless of where the user is in scrolling through the scrollable page (i.e., the user is not required to scroll through the questions and answers in order to invite the other party into the open session or to save the draft as a template). In one embodiment, below each answer is the option to change the answer which, if selected, will take the user back to the identified question such that the user can modify the response. The right side of the screen (contract half) remains in sight during summary view and scrolls in coordination with the left.

Once the initiating party is satisfied with the selections, the user saves the draft as a template (described further herein) or sends the draft to the receiving party. When sending to the receiving party, a confirmation box appears advising that an invitation has been emailed to the receiving party and that, once the receiving party has completed its review (and, if applicable, proposed any modifications or made any comments), the initiating party will receive an email inviting the user back into the open session.

The receiving party receives the email invitation from the initiating party to participate in an open session in order to negotiate and execute the agreement. The email provides a hypertext link to take the receiving party directly into the system. Upon clicking the link, the receiving party is taken to a welcome screen that includes information about the system and provides the receiving party with instructional videos to watch before proceeding. While it is suggested that the receiving party watch the videos, it is not required in order to proceed. At the bottom of the page, the receiving party is prompted to create a username and password to enable use of the system. Upon creating a username and password, the receiving party is registered and, upon doing so, is taken to a new screen.

Similar to when the initiating party when built the contract, the receiving party is taken to a page where he or she is welcomed with a "How it Works" note. The contract, as built by the initiating party, is shown in the background.

The receiving party is advised via sequential notes of the following: (1) that the system will query or otherwise obtain information in four different formats: (a) free-form text entry; (b) yes/no selections; (c) multiple choice; and (d) choose all that apply; (2) that the user can supplement any input with comments that will be provided to the other party; (3) that the areas where the initiating party had input (and made selections) are highlighted in the initiating party's assigned color in the agreement (blue), and that receiving party will be able to review the initiating party's choices and options; (4) that the receiving party will be able to change the initiating party's selections, and provide comments to the initiating party relative to same, if so desired; and (5) that, if the user needs to learn more about a particular issue, the user can click a hyperlink that will open a page providing further education on the matter; and (6) that the user will be able to review his or her choices before the contract is provided to the other party. Upon closing out of the final note, the receiving party is presented with the detail view.

The top of the screen in the detail view includes a colored banner, the right corner of which identifies the receiving party by name and the receiving party's associated color from the party identification page (e.g., green). The screen also includes a "sign agreement" button that, when clicked, treats all provisions provided by the initiating party as accepted and commences an electronic signature protocol, described in greater detail herein. To the left of the "Sign" button is the "EZ-AGREE" button, which is also described in greater detail herein. To the left of the "EZ-AGREE" button is another button titled "Live Discussion," which is also described in greater detail below. In the left corner of the banner, the particular contract is identified (e.g., for a lease, with the receiving party's name and the property address).

Below the banner, the agreement is shown in a single screen. The upper right corner of the agreement contains a tab/button with a number (e.g., 15)—when the receiving party selects the number, the tab expands to the left and shows the words "Open Issues" which, when combined with the number, indicate to the receiving party how many areas of the contract include input from the initiating party. In another example, the number presented to the receiving party at the outset of the receiving party's review is zero. Then, for each issue for which the receiving party requests a hold or provides a new answer, the number increases to show the number of outstanding issues. In either instance, the function of the open issues notifier is to give clear and direct, real-time feedback regarding the number of open issues between the parties.

Below the expanded button is a list of cross-reference hyperlinks to the sections of the agreement that contain areas where the initiating party had input. If the receiving party wants to jump directly to an open issue in the contract (as opposed to scrolling through the contract), the receiving party can click the cross-reference and the screen will scroll to the highlighted section (highlighted in the color of the initiating party—here, blue) of the contract corresponding to the cross-reference.

Upon scrolling through the contract, the receiving party sees that certain section of the contract are highlighted in the color of the initiating party (blue). If the receiving party selects a highlighted paragraph, the selection is called out in a box and an icon appears in the right corner of the box that represents radio buttons. If the receiving party selects the icon, the words "Show Options" appear.

Upon selecting the "Show Options" icon, the screen splits left and right. The contract is greyed out on the right. On the left, the question that was posed to the initiating party coinciding with the particular section is shown. Below the query is a hyperlink with the words "Learn More". If the receiving party clicks on the link, a box opens on the page containing further information about the subject—e.g., an explanation of why this item is a negotiable issue and what the issue means in plain-language.

Below the hyperlink are the options that were provided to the initiating party in response to the query: if it was a question that required a freeform response, the initiating party's response is included as well as space to type an alternative response; if it was a yes/no question, buttons for each of "yes" and "no" are shown; if it was multiple choice; buttons and corresponding language describing the various options are provided; if it was a question where the initiating party could choose some or all of the options, boxes to check and corresponding language describing the various options are included. The initiating party's choice is identified and highlighted in the associated color (blue). At the top of the left split screen are two icons (a clock and a note) and a box that can be selected to close the view.

There are five actions the receiving party can take from this screen: (1) the receiving party can click the "Learn More" hyperlink, which will cause a box to open on the page containing further information about the subject—e.g., an explanation of why this item is a negotiable issue; (2) the receiving party can click the clock icon, which will display the history of the parties' respective positions on the issue by listing, in time-stamped, chronological format, the choices selected and highlighted using the color of the party that made the selection; (3) the receiving party can click the note icon, and a box opens inviting the receiving party to type in comments or other communications the receiving party would like to make to the initiating party (upon typing in information, the receiving party may select the "save comment" button, upon which time the comment disappears, the receiving party is advised that the comment will be provided to the initiating party, and the comment is time-stamped); (4) the receiving party can choose an alternative answer to that provided by the initiating party (or, if the query requires a typewritten response, provide a different response); if this is done, the receiving party's alternative choice is highlighted in the receiving party's color (green), the right side of the screen (the contract half) immediately scrolls to the area of the contract that relates to the query, and the legal language corresponding to the input provided is generated and highlighted with the color associated to the party (e.g., green)—the receiving party may, on the same screen and without proceeding further, provide alternative input (e.g., select a different choice in response to the query); the legal language corresponding to the input provided is simultaneously generated and highlighted with the color associated to the receiving party (e.g., green) on the right side of the screen (the contract half) and the receiving party can do this as many times as desired—that is, the legal language that is associated with the choice can be reviewed in every instance (though the receiving party can simply rely upon the high-level description set forth on the left side of the screen); and (5) the receiving party can do nothing, close out of the split screen view by clicking on the "close" box, and return to the detail view.

Either by using the links in the Open Issues list in the upper right corner of the contract, or otherwise by scrolling through the agreement, the receiving party can react to the open issues as described above.

If the receiving party makes a proposed change to at least one of the highlighted sections, the "Sign" button in the banner is immediately changed to a button entitled "Review Changes"; the contract cannot be signed with proposed changes pending and not agreed upon.

When the receiving party has completed his or her review of the contract, the party must then click the "Review Changes" button to proceed (or, if no changes were made, the "Sign" button, the sequence of which is described below).

Upon clicking the "Review Changes" button, the screen splits left and right. The contract is greyed out on the right. On the left, instructions are provided to the receiving party that advise of the following: (1) that the left panel summarizes the receiving party's position on the negotiable issues in the contract; (2) that if the receiving party has proposed a change to the initiating party's input, the receiving party's proposed response is highlighted in the associated color (green) and is characterized as a "Proposed Change"; (3) that if a change was not proposed by the receiving party, the initiating party's original answer to the question is set forth in blue, the issue is characterized as "Agreed", the receiving party is deemed to have accepted the initiating party's position, and the issue will be removed from the open issues list going forward.

Below the instructions, each question posed to the initiating party is listed with either (a) the answer the initiating party chose (if the receiving party has not proposed a different response), highlighted in the initiating party's color (blue) with the word "Agreed" below it, or (b) the answer the receiving party prefers, highlighted in the receiving party's color (green) with the word "Proposed Change" below it. For each question and answer, there is a button to the right entitled "Change Option"—if the receiving party has changed his or her mind as to a particular issue, clicking this button will takes the receiving back into detail view to modify the response to the initiating party's position, as described above. The questions and answers are all on one, scrollable page, with a button, "send to <other party>"

always available on the bottom of the page (i.e., the user is not required to scroll through the questions and answers in order to invite the initiating party back into the open session). The right side of the screen (contract half) remains in sight during summary view and scrolls in coordination with the left.

Once the receiving party is satisfied with the selections, the receiving party selects "send to <other party>" and a confirmation box appears advising that an invitation has been emailed to the initiating party and that once the initiating party has completed its review (and, if applicable, proposed any modifications or made any comments), the receiving will receive an email inviting him or her back into the open session. The process iterates between the initiating party and the receiving party until the contract is (a) completed and electronically signed or (b) abandoned.

At any point in the open session, a party can choose to abort or abandon the open session. The user does so by hitting a designated button at the top of the page while in detail view. When a user selects to abort, the following occurs: (1) the system generates a report, in .pdf format, that includes the following information: (a) the original choices and inputs of the initiating party; (b) a list of points of agreement (i.e., closed issues) and the history of the parties positions during negotiations, including all comments/communications regarding same; and (c) a list of points of disagreement (i.e., open issues) and the history of the parties positions during negotiations, including all comments/communications regarding same; (2) the system generates a text document that includes the contract as completed when containing all of the closed issues and for those sections of the contract that are open issues at the time of abandonment, language corresponding to the most recent selection of a party is included, is highlighted in that party's color, and is physically marked with "[OPEN]" at the beginning of the first paragraph of the open section; and (3) the open session may be marked as "aborted" on the dashboard.

At any time while a party is in detail view, the user can initiate a request for a telephone or video conference with the other party to discuss matters—likely, the remaining open issues in the contract. To do so, the user selects the "Live Discussion" button at the top of the page while in detail view. Selecting this feature causes the system to do the following: (1) generate a report, in .pdf format, that identifies each section of the agreement upon which there is not yet agreement (i.e., the open issues)— for each issue the report will provide: (a) the question originally posed to the initiating party when building the contract, options as to answers the initiating party could have chosen, and the history (if any) of the positions taken by the parties, in time-stamped and highlighted format; (b) a record of any communications (i.e., comments) made by the parties as to the issue, in time-stamped format; (c) any explanation provided by the system as to the section (i.e., the text that would be shown if a party selected the "Learn More" hypertext link); and (d) a blank section where a party can provide notes (either electronically or, if the report is printed out, via handwriting); (2) open a dialogue box in which the party can type a message to the other party regarding the request for a live interaction—for instance, the requester might indicate that he or she thinks the parties are close to resolution, and would like to get on a call at 2:30 pm on May 23rd to discuss same (in an alternative embodiment, the system may trigger an automatic calendaring process, e.g., send a meeting invite in Outlook); and (3) upon selecting "Send" on the dialogue box, the system generates an email to the other party in which it includes the text inserted in the dialogue box, and to which it attaches the open issues report. It is presumed that the parties will thereafter participate in direct communications with respect to the open issues via the system or by other means.

It is contemplated that in some instances, the two parties may wish to negotiate the entire agreement in a live interaction. In such instances, the initiating party may create the initial draft while discussing the issues with the receiving party live, in person, over the phone, through screen sharing and/or video conferencing platforms, etc. Thus, when the initiating party has entered information for each of the open issues, the receiving party should be ready to execute the first draft of the agreement when received (or forward to counsel for appropriate review). It is further contemplated that the system provided herein may incorporate such screen sharing modules as required to allow both parties to simultaneously share the view of the contract to facilitate the live negotiation.

Once a user has completed the legal build phase of the contract (i.e., entered the business terms, made selections as to the legal provisions to be included, and choosing the options), the user is prompted to review the selections before inviting the other party to participate. At the bottom of this page, along with the "send to <other party>" button, there will be a "save as template" button. Selecting this button prompts the user to name the agreement (e.g., small office triple net lease) and save it as a template for future use. Upon accessing the dashboard after saving the template, the user can choose the dropdown menu "Templates" and the saved template will be listed and able to be chosen.

Upon choosing a template, the user is sent to the Business Build View, where the user inputs the business terms, as more particularly described above. However, upon getting to the Legal Build View, the user will be notified that he or she has chosen to work in the "<name> template", that the choices as to legal provisions have been pre-selected, and the user is shown the summary view. In summary view, each question posed to the user is listed with the answer the user chose identified below the question in the highlight of the user's color. The questions and answers are all on one, scrollable page, with a button, "send to <other party>" always available on the bottom of the page (i.e., the user is not required to scroll through the questions and answers in order to invite the other party into the open session). Below each answer is a button entitled "change options" which, if clicked, takes the user back to the identified question such that the user can modify the response. The right side of the screen (contract half) remains in sight during summary view and scrolls in coordination with the left.

Once the user is satisfied with the selections, the user (the initiating party) selects "send to <other party>" and a confirmation box appears advising that an invitation has been emailed to the receiving party and that once the receiving party has completed its review (and, if applicable, proposed any modifications or made any comments), the initiating party will receive an email inviting the initiating party back into the open session.

It is contemplated that the statistics that can be derived from aggregated and anonymized data acquired through the system may be very useful in benchmarking and understanding the market standard terms for various agreements. For example, it may be very valuable to aggregate and anonymize the legal selections ultimately chosen by the parties in the agreements that are executed, thereby giving greater insight into how common each potential contract term may be.

In one embodiment of the system, provided there is a statistically significant pool of data for a given contract term, when a user is in the split screen view (or the initial user is in legal build view), and where the data input option is yes/no, multiple choice, or choose from many, a notation will be provided adjacent to each of the options offered indicating the percentage of time parties ultimately selected each option. This data is automatically updated with each new transaction that is consummated through the system. The statistics may be more granular as well, for example, in a lease indicating the percentage of time a term is proposed by a landlord vs. proposed by a tenant. The statistics may also include trend analysis, such that in addition to providing the percentage of times a given term is used, the statistics may indicate whether the term is being agreed to more or less frequently in recent transactions.

The system may keep and analyze other data as well; for instance, how many times a user interacts, total time from initiation to signature, etc.

As described above, one example of the system includes a GUI designated as the legal build view. in the example described, the GUI includes a colored banner, the upper right corner of which identifies the user by name, as well as identifies the associated color from the party identification page (e.g., blue). In the upper left corner of the banner, the particular contract is identified (e.g., for a lease, with the other party's name and the property address). In a preferred embodiment of the system, the center of the banner includes a button entitled "EZ-CHOOSE". Below the banner, the screen is split in half (the center margin of which may be dragged left or right to increase one side of the screen and correspondingly shrink the other).

On the right side of the screen is the in-progress contract, and the user may scroll through and see the language of the contract as it exists both before and during the user input phase. On the left side is a heading identifying the subject matter of the first query to be made to the user, and below the heading is a question to the user as to a legal issue (e.g., for a lease, "Will you require the tenant to provide you with annual financial statements?").

If the user selects the "EZ-CHOOSE" button, then, for those queries for which there are statistics pertaining to usage (i.e., yes/no, multiple choice, choose from many options) the system automatically populates the user's response with the statistically most common choice, thereby enabling the user, through a single user action, to select each of the most commonly agreed to contract terms that are available.

The system may then direct the user to answer the queries that do not have statistical information (i.e., write-ins), resulting in a far shorter list of items to address (or, perhaps, none, if all of the queries are multiple choice, etc.); after answering the limited number of queries (or, perhaps, none) the user will be taken to summary view to double-check her choices—all of the choices will be listed here, even those that were included as a result of EZ-CHOOSE, such that the user cannot send the contract out blindly. The user will then select "send to <other party>" as in the normal workflow.

It is contemplated that the EZ-CHOOSE functionality may be fine-tuned for a particular user. For example, in a landlord/tenant negotiation there may be options to use the EZ-CHOOSE function to populate the contract with the terms most commonly chosen by other parties on the same side of the transaction as the given user. In another example, a user may be provided an interface through which the contact issues can be selectably included or excluded from the EZ-CHOOSE function, such that the execution of the EZ-CHOOSE function only affects those contract terms explicitly included in the function or specifically does not affect the contracts terms that are explicitly excluded from the function.

When the receiving party participates in an open session and enters the detail view, the top of the GUI includes a colored banner, the right corner of which identifies the user by name and the associated color from the party identification page (e.g., green) and also contains a button, "Sign", that, when clicked, treats all provisions provided by the initiating party as accepted and commences the electronic signature protocol. In a preferred embodiment, between the "Sign" button and the "Live Discussion" button is an "EZ-AGREE" button. In the left corner of the banner, the particular contract is identified (e.g., for a lease, with the tenant's name and the property address).

When the user selects the "EZ-AGREE" button, for those queries for which there are statistics pertaining to usage (i.e., yes/no, multiple choice, choose from many options), and where the initiating party has chosen the statistically most common choice, the system will automatically treat the receiving party as having accepted the initiating party's selection and those particular sections will have the initiating party's highlighting removed from them, and will be correspondingly removed from the open issues list in the upper right corner of contract review mode.

Detail view may then show as highlighted (and in the open issues list) only those sections that do not have statistical information (i.e., write-ins) and those areas where the initiating party did not choose the statistically most common choice, resulting in a far shorter list if items to address (or, perhaps, none, if all of the queries are multiple choice and the initiating party used EZ-CHOOSE, etc.); after reviewing the limited number of queries (or, perhaps, none), if the receiving party has suggested any changes, the receiving party will select the "Review Changes" button that replaces the "Sign" button at the top of the page, and will be taken to the summary view to double-check the choices—all of the choices will be listed in the summary view, even those that were included as a result of EZ-AGREE, such that the user cannot send the contract out blindly. The user will then click "send to <other party>" as in the normal workflow. Obviously, if the receiving party does not suggest any changes, the receiving party would enter the signature protocol (clicking the "Sign" button at the top of the page).

In one example of the systems and methods described herein, a contract negotiation and drafting system includes: one or more user devices; a controller in communication with the one or more user devices; a memory coupled to the controller, wherein the memory is configured to store program instructions executable by the controller; wherein in response to executing the program instructions, the controller is configured to: provide a first graphical user interface accessible through the one or more user devices through which a first user is presented a contract window and a legal issue window, wherein the contract window displays a contract and the legal issue window displays a legal issue input tool through which the first user provides input through the one or more user devices for each of a plurality of legal issues, wherein at least one of the inputs provided by the first user for at least one of the plurality of legal issues is a selection from a plurality of options; update the contract in the contract window of the first graphical user interface in response to the input provided by the first user through the one or more user devices for each of the plurality of legal issues; provide a second graphical user interface accessible through the one or more user devices through which a second user is presented the contract window and the legal issue window, wherein the contract window displays the updated contract and the legal issue window displays the legal issue input tool through which the second user provides input for each of the plurality of legal issues, wherein the legal issue window identifies the first user's selection from the plurality of options and the legal issue window identifies each of the plurality of options not selected by the first user; and update the contract in the contract window of the second graphical user interface in response to the input provided by the second user through the one or more user devices for each of the plurality of legal issues.

In these examples, the update of the contract in the contract window of the first graphical user interface in response to the input provided by the first user through the one or more user devices for each of the plurality of legal issues includes highlighting the updated language in a color assigned to the first user. The update of the contract in the contract window of the second graphical user interface in response to the input provided by the second user through the one or more user devices for each of the plurality of legal issues includes highlighting the updated language in a color assigned to the second user.

The update to the contract in the contract window of the first graphical user interface in response to the input provided by the first user through the one or more user devices for each of the plurality of legal issues may include adding a new section to the contract or removing a section from the contract.

The first graphical user interface and the second graphical user interface may each include a counter displaying a number of the plurality of legal issues for which an agreement between the first user and the second user has yet to be reached.

The first graphical user interface and the second graphical user interface may each include a contract overview window including a list including each of the plurality of legal issues and an identification of whether agreement has been reached for each of the plurality of legal issues.

The memory may include statistics derived from data from a plurality of contracts for which agreement has been reached by two parties, the statistics including an identification of a most commonly agreed input for at least one of the plurality of legal issues that is a selection from a plurality of options. Using those statistics, the first graphical user interface may include a first selection tool, the execution of which automatically chooses, in lieu of the legal issue input tool, the input of the first user for each of a plurality of legal issues for which the statistics include an identification of the most commonly agreed input (i.e., EZ-CHOOSE). Using those statistics, the first graphical user interface and the second graphical user interface may each include a second selection tool, the execution of which automatically agrees to each of the plurality of legal issues for which an agreement between the first user and the second user has yet to be reached for which a current selection is the input identified by the statistics as the most commonly agreed input (i.e., EZ-AGREE).

An advantage of the present system is that it enables direct communication between contracting parties concerning specific contractual terms. Prior to the present invention, it was common practice to use redlining or track changes to communicate information between contracting parties or their agents. Such a process has no real regulated standards by which it is practiced and is extremely tedious and time consuming.

An object of the present invention is to empower contracting parties to control all aspects of their deal.

Another object of the present invention is to provide an efficient system. There is no need for the contracting parties to draft their own contract language, the legal terms are all provided in the template agreement. The parties merely select which legal term to include based on selection of positions written in business terms, not legal terms.

Another object of the invention is to provide a cost-effective system. The automated features and functions of the system described herein greatly reduce the necessary reliance on expensive legal teams where they aren't required. Your attorneys can focus on high value contributions to your business than red-lining iterations of a simple contract.

An advantage of the present invention is that work done in setting up a given agreement may be saved as a template for future use, even further improving the efficiency of the system.

An advantage of the present invention is that the template format makes it easy to improve consistency in contracting terms, whether for a single party or across an industry. Twenty lawyers may write the same agreement twenty different ways. This is unnecessary when one way is good enough.

Another advantage of the present invention is its ability to update the contractual terms in the template agreements. Since the present system is computerized, the underlying templates can be revised in real-time based on any number of data sources. For example, when a new court decision is rendered affecting contractual terms, related contractual terms in the templates can be edited in real-time to prevent issues with newly formed contracts going forward.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is an example of a receiving party information screen in a GUI of an embodiment of the contract negotiation and drafting system shown in FIG. 1.

FIG. 8 is another example of an initiating party legal build screen in a GUI of an embodiment of the contract negotiation and drafting system shown in FIG. 1.

FIG. 9 is another example of an initiating party legal build screen in a GUI of an embodiment of the contract negotiation and drafting system shown in FIG. 1.

FIG. 12 is an example of a summary view window within a legal build screen in a GUI of an embodiment of the contract negotiation and drafting system shown in FIG. 1.

FIG. 14 is an example of a receiving party detail view screen in a GUI of an embodiment of the contract negotiation and drafting system shown in FIG. 1.

FIG. 20 is an example of a history view screen in a GUI of an embodiment of the contract negotiation and drafting system shown in FIG. 1.

FIG. 21 is another example of the dashboard of an initiating party provided in a GUI of an embodiment of the contract negotiation and drafting system shown in FIG. 1.

DETAILED DESCRIPTION OF THE INVENTION

Figure 1:
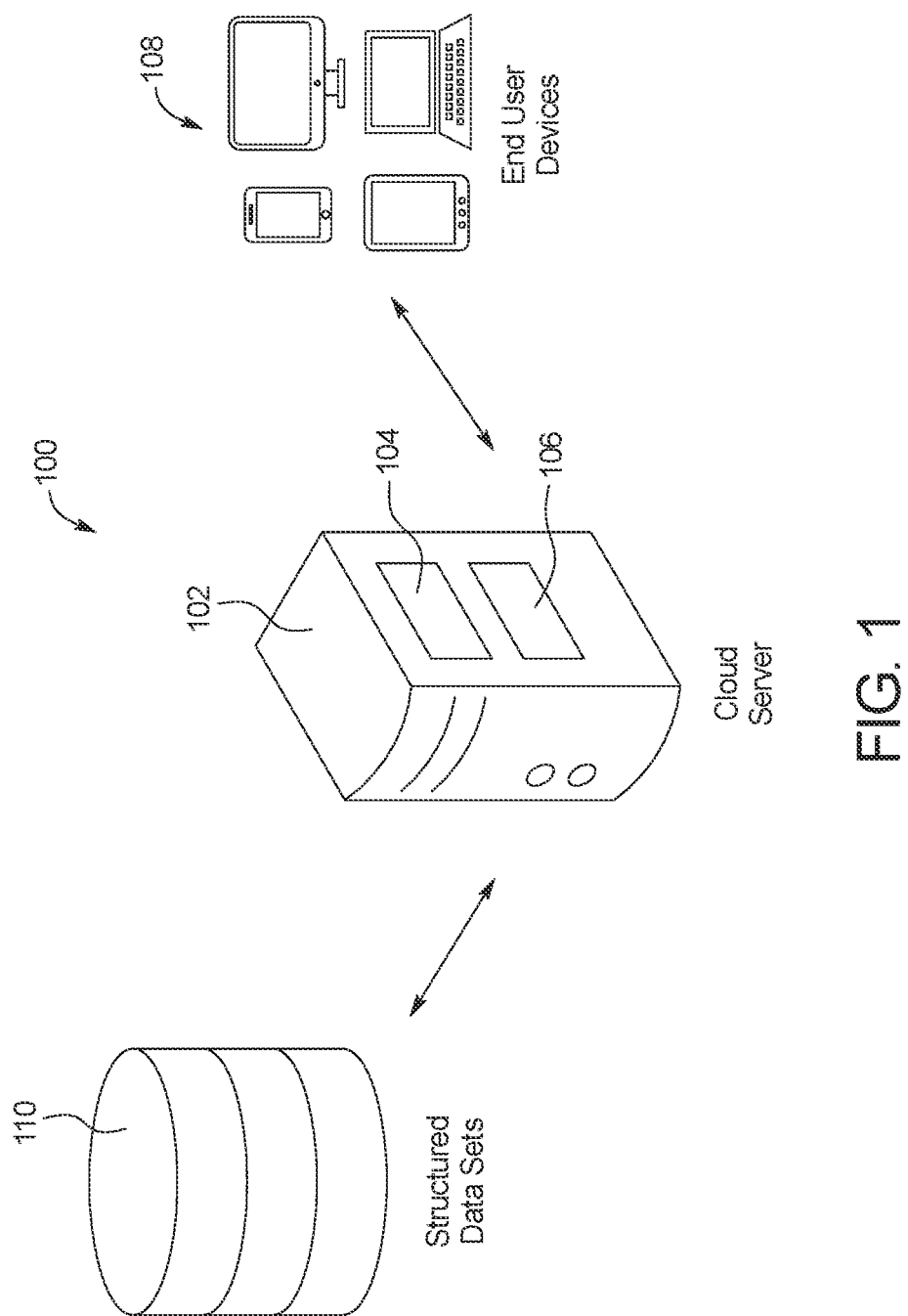
FIG. 1 is a schematic view of components of a contract negotiation and drafting system embodying the present invention.

FIG. 1 is a schematic representation of an example of components of a contract negotiation and drafting system 100 (system 100). In the example shown in FIG. 1, the system 100 includes a cloud server 102 (server 102) including one or more controllers 104 and memory 106. The server 102 is in communication with one or more end user devices 108 and one or more structured data sets 110.

The features and functions of the system 100 are provided to users through one or more graphical user interfaces (GUIs). The GUIs are accessed by the users through the one or more end user devices 108. Typical end user devices 108 include smartphones, tablets, laptops, personal computers, kiosks, etc. In a typical embodiment, the one or more programs providing the GUIs to the users are hosted in the server 102. The server 102 includes one or more controllers 104 in communication with memory 106 including instructions that, when executed, cause the one or more controllers 104 to perform the various functions described herein. The memory 106 in communication with the controller 102 is further used to store data in and receive information from one or more structured data sets 110, for example in a database 110, as shown in FIG. 1. For example, the various contracts and contract templates described herein may be stored in the database 110 such that they are accessible to users through their end user devices 108. It is understood that the specific structure described above is merely one example of a structure that may be used to host and deploy the system 100.

Representative example GUIs are illustrated in FIGS. 2-21 to provide the context for the explanation of the features and functions of the system 100. It is recognized that while there may be numerous UX designs that may be used to accomplish the objects and advantages of the system 100, there may be instances in which specific aspects of a given GUI are critical to accomplishing the objects and advantages of the invention. For example, it is contemplated that in some instances, a combination of specific displays and controls in a single interface of a GUI may be inventive subject matter.

Figure 2:
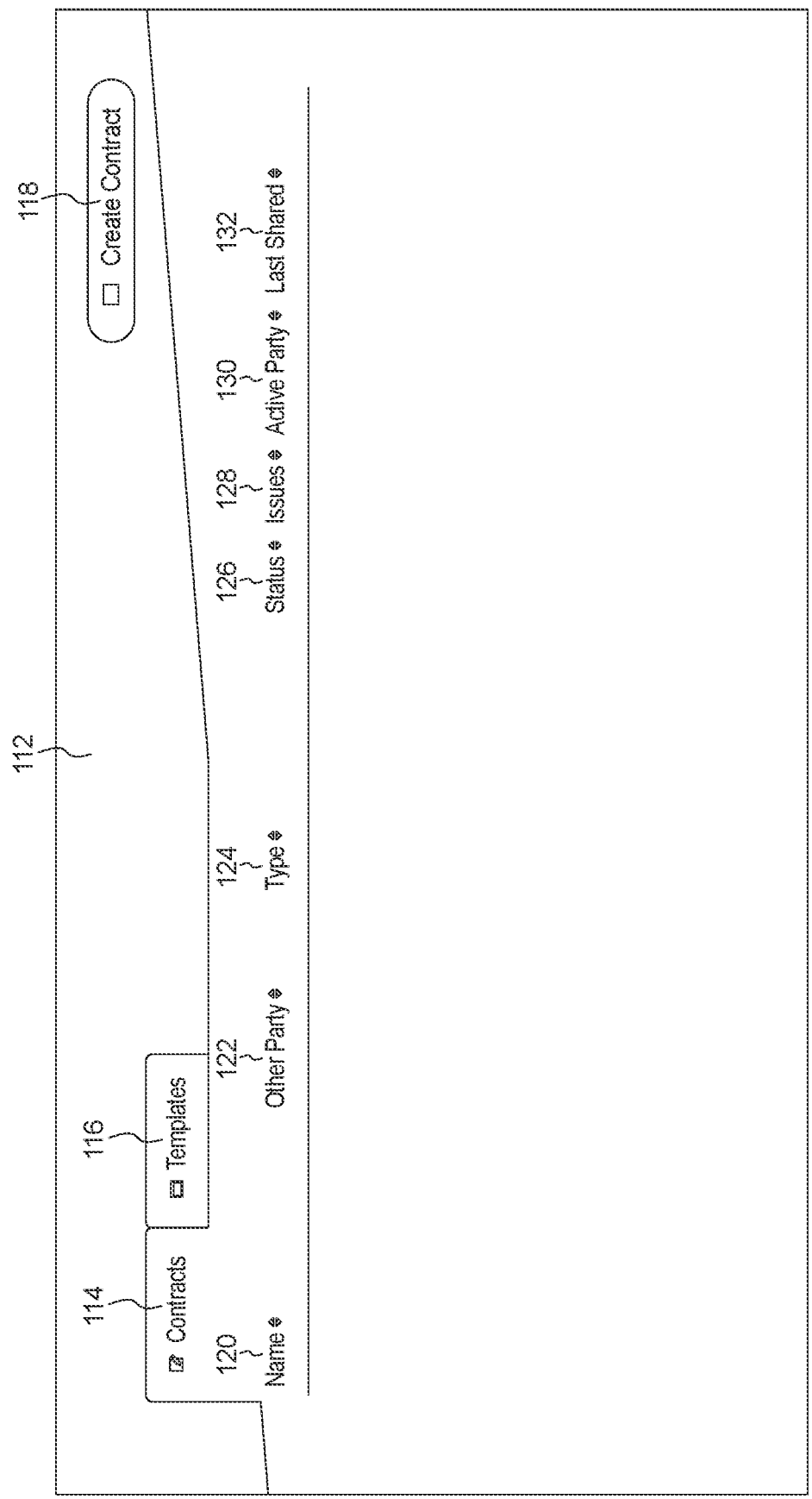
FIG. 2 is an example of a dashboard of an initiating party provided in a GUI of an embodiment of the contract negotiation and drafting system shown in FIG. 1.

Turning now to FIG. 2, an example of an initiating party's dashboard 112 in the contract negotiation and drafting system 100 is shown. The dashboard 112 includes two tabs, a contacts tab 114 and a templates tab 116. The dashboard 112 also includes a button to create a new contract 118. Any existing contracts (executed or in negotiation) will be listed in the dashboard 112 accessible when the contracts tab 114 is selected. In the example shown, the listing of the contracts provides the name of the contract 120, the name of the other party 122, the type of agreement 124, the status of the agreement 126, the number of outstanding issues in the agreement 128, identification of the active party 130 (the party that must take the next action), and the time and date an update to the agreement was last shared between the parties 132.

When the templates tab 116 is selected, a listing of the available templates is shown to the user. Such templates may be accessible through the dashboard 112, for example, to be updated and customized, or simply to be reviewed. The templates are saved versions of a given contract type in which some, or all, of the options the initiating party is to input before sending the agreement to the receiving party have already been prepopulated.

The dashboard 112 is provided for each user (initiating and receiving) to manage the user's assets in the system 100. In one example, the dashboard 112 provides a dropdown menu identifying the various types of contracts that are available for creation and negotiation when the user selects the create contract button 118.

When a user wants to view an executed contract from the dashboard 112, the user selects the particular contract to view (and print, if desired) a .pdf of the fully-executed agreement. If a user wants to interact with a contract that is in the negotiation phase, the user can select the subject contract and be taken into the detail view (described further herein). If the user wants to create a new contract using a previously-saved template (e.g., partially completed form contract), the user can select the desired template from the template menu and be taken to the contract build mode (described below). Finally, if the user wants to create a new contract without the aid of a previously-designed template, the user may choose the create contract button 118.

The contracts available in the system 100 may be provided by the system administrators, may be built and uploaded by the end users, and/or may be provided by third-parties. It is contemplated that the system 100 described herein may be a platform in which the legal community builds and shares form agreements that greatly improve the efficiency and efficacy of the contract negotiation market. Accordingly, a contract custom built by a given party may find a commercially marketable use in being licensed or sold to other users of the system 100.

Figure 3:
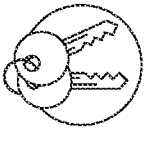
FIG. 3 is an example of a create contract screen in a GUI of an embodiment of the contract negotiation and drafting system shown in FIG. 1.

When the initiating user selects the button to create a new contract 118, a create contract screen 134 is presented, an example of which is shown in FIG. 3. As shown in FIG. 3, the create contract screen 134 includes a contract type selection tool 136 that enables the user to select the type of contract to create and a contract name input 138 in which the initiating user names the agreement. In this example, the initiating user uses the contract type selection tool 136 to choose to create a non-disclosure agreement (NDA) and uses the contract name input 138 to name it "Demo".

Figure 4:
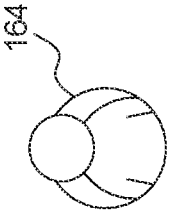
FIG. 4 is an example of an initiating party information screen in a GUI of an embodiment of the contract negotiation and drafting system shown in FIG. 1.

FIG. 4 shows an initiating party information portion of the create contract screen 134 through which information about the initiating party is collected. As shown in FIG. 4, the create contract screen 134 further includes inputs through which the initiating user identifies the type of party 140 (e.g., individual or business), provides the initiating party's name 142, selects the business type 144, and selects the state of incorporation 146. Different information may be collected for businesses and individuals. For example, if the selected party type was an individual, rather than a business, the create contract screen 134 may ask the initiating user to identify the state of residence of the individual.

Figure 5:
FIG. 5 is an example of additional aspects of the initiating party information screen in the GUI of the embodiment of the contract negotiation and drafting system shown in FIG. 4.

As further shown in FIG. 5, the initiating party information portion of the create contract screen 134 further includes inputs through which the initiating user identifies the initiating party's address 148, the name of the person signing on behalf of the initiating party 150, the title of the person signing on behalf of the initiating party 152, and the email address of the person signing on behalf of the initiating party 154.

Turning to FIG. 6, the create contract screen 134 further includes a receiving party information portion through which the initiating user identifies the type of party 156 (e.g., individual or business), provides the receiving party's name 158, provides the receiving party's address 160, and provides the receiving party's email address 162.

A further element of the create contract screen 134 shown in FIGS. 3-6 is that each party is assigned a unique color that is used in the agreement to designate actions of that party within the system 100. For example, in the initiating party information portion of the create contract screen 134 shown in FIGS. 4 and 5, the initiating party icon 164 may be shown in the color of the initiating party (e.g., blue). In FIG. 6, the receiving party icon 164 may be shown in the color of the receiving party (e.g., green).

Once the initiating user has input all of the required information in the create contract screen 134, the user is taken to the initiating party legal build screen 168. The initiating party is then directed, sequentially, to make the initial contract provision selections through the initiating party legal build screen 168. Through this process, the initiating party prepares the initial draft of the agreement to share with the receiving party.

Figure 7:
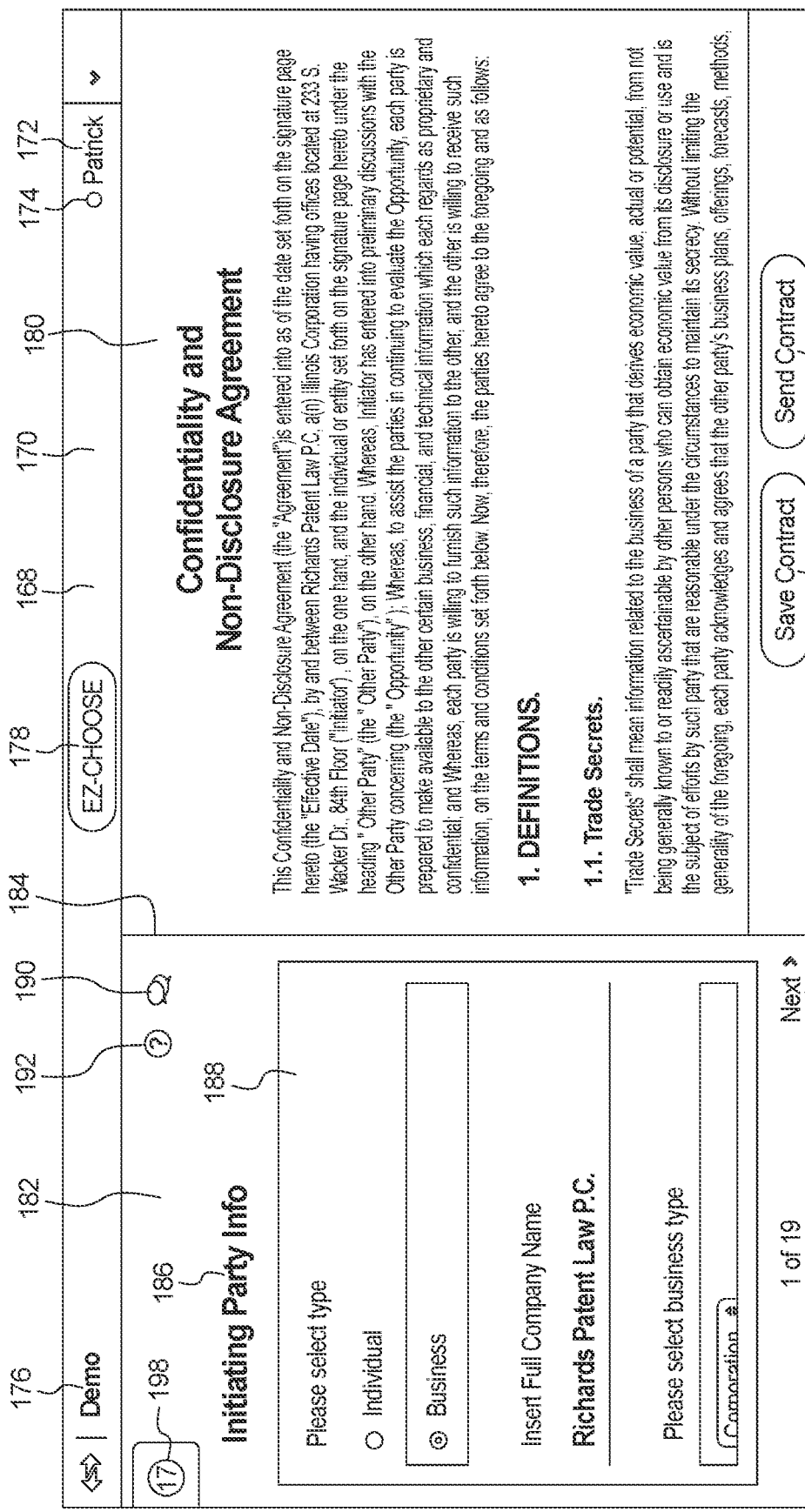
FIG. 7 is an example of an initiating party legal build screen in a GUI of an embodiment of the contract negotiation and drafting system shown in FIG. 1.

In the example shown in FIG. 7, the initiating party legal build screen 168 includes a banner 170, the upper right corner of which identifies the user by name 172 and indicates the user's associated color 174 (e.g., blue). In the upper left corner of the banner 170, the particular contract is identified by name 176 (e.g., Demo). In the center of the banner is an "EZ-CHOOSE" button 178, the function of which is described in greater detail herein. Below the banner 170, the screen 168 is split in two vertically divided windows, the in-progress contract window 180 and the legal issue window 182. In the example shown in FIG. 7, the margin 184 between the in-progress contract window 180 and the legal issue window 182 may be dragged left or right to increase one side of the screen 168 and correspondingly shrink the other.

As shown in FIG. 7, the in-progress contract window 180 is on the right side of the initiating party legal build screen 168. The initiating party may scroll through the contract to see the language of the contract as it exists. This access is provided before, during, and after the initiating party inputs the requested data.

In the legal issue window 182 on the left side of the initiating party legal build screen 168 is a heading 186 identifying the subject matter of the first query to be made to the initiating party. Below the heading 186 is a legal issue input tool 188 through which the initiating user provides one or more answers to input requests from the system 100. For example, in FIG. 7, the legal issue input tool 188 is requesting input from the initiating party regarding the initiating party's information. Because this specific information was already provided by the initiating party in the initiating party information portion of the create contract screen 134, the initiating user needs only to verify the information before moving on to the next heading 186 and related legal issue input tool 188.

Above and to the right of the heading 186 is a notation icon 190. When a user selects the notation icon 190, a box opens inviting the user to provide comments or other communications the user would like to make to the other party relating to the issue at hand (see FIGS. 17-19). Upon providing any comments, the user is advised that the time-stamped comment will be provided to the other party.

Adjacent the notation icon 190 is an additional information icon 192 for the initiating party to obtain additional information about the specific issue at hand. When a user selects the additional information icon 192, a pop-up window opens containing further information about the subject—e.g., an explanation of why this item is a negotiable issue and what the issue means in plain-language.

Within the legal issue input tool 188, if the input requested requires a typewritten response, space to type the response may be provided. If the answer to a yes/no question is required, buttons for each of "yes" and "no" may be provided. If the answer to a multiple-choice question is required, buttons and corresponding language describing the various options may be provided. Alternatively, a drop-down list of options may be provided. If the legal issue input tool 188 asks a question where the user may choose some or all of the options, boxes to check and corresponding language describing the various options may be provided. As shown, the form of the legal issue input tool 188 is adaptable to best suit the type of input required.

Upon inputting a response to the query in the legal issue input tool 188, the in-progress contract window 180 scrolls to the area of the contract that relates to the query, and the legal language corresponding to the input provided is generated, inserted, and highlighted with the color associated to the party (e.g., blue).

In the example shown in FIG. 8, the heading 186 indicates that the legal issue is the start date of the contract and the legal issue input tool 188 requests the user to input a date in a properly recognized date format (e.g., dd/mm/yyyy). When the initiating party provides the start date in the legal issue input tool 188, the in-progress contract window 180 scrolls to the signature portion of the agreement and inserts the effective date.

If the initiating party has included a comment with the selection, using the notation icon 190, an envelope icon 194, along with a marking in the associated color (blue), is set forth in the right margin next to the highlighted text.

One of the features of the legal issue input tool 188, provided in combination with the in-progress contract window 180, is that the user may, on the same screen and without proceeding further, provide alternative input (e.g., select a different choice in response to the query) to observe in real-time how the input affects the legal language in the contract. As the user enters input into the legal issue input tool 188, the legal language corresponding to the input provided is simultaneously generated, inserted, and highlighted with the color associated to the party (e.g., blue) in the in-progress contract window 180. The user can do this as many times as he or she likes—that is, the user can review the legal language that is associated with the user's selections or input within the legal issue input tool 188 in every instance, though the user is not required to do so and can rely on the high-level description set forth in the legal issue window 182.

Once the initiating party is satisfied with the selection made in the legal issue input tool 188, the initiating party saves the selection by selecting the next button 196 at the bottom of the legal issue input tool 188 and, upon doing so, the legal issue window 182 moves to the next query and updates the heading 186 and the legal issue input tool 188. The process repeats until the initiating user has answered all of the queries generated by the system 100.

Figure 10:
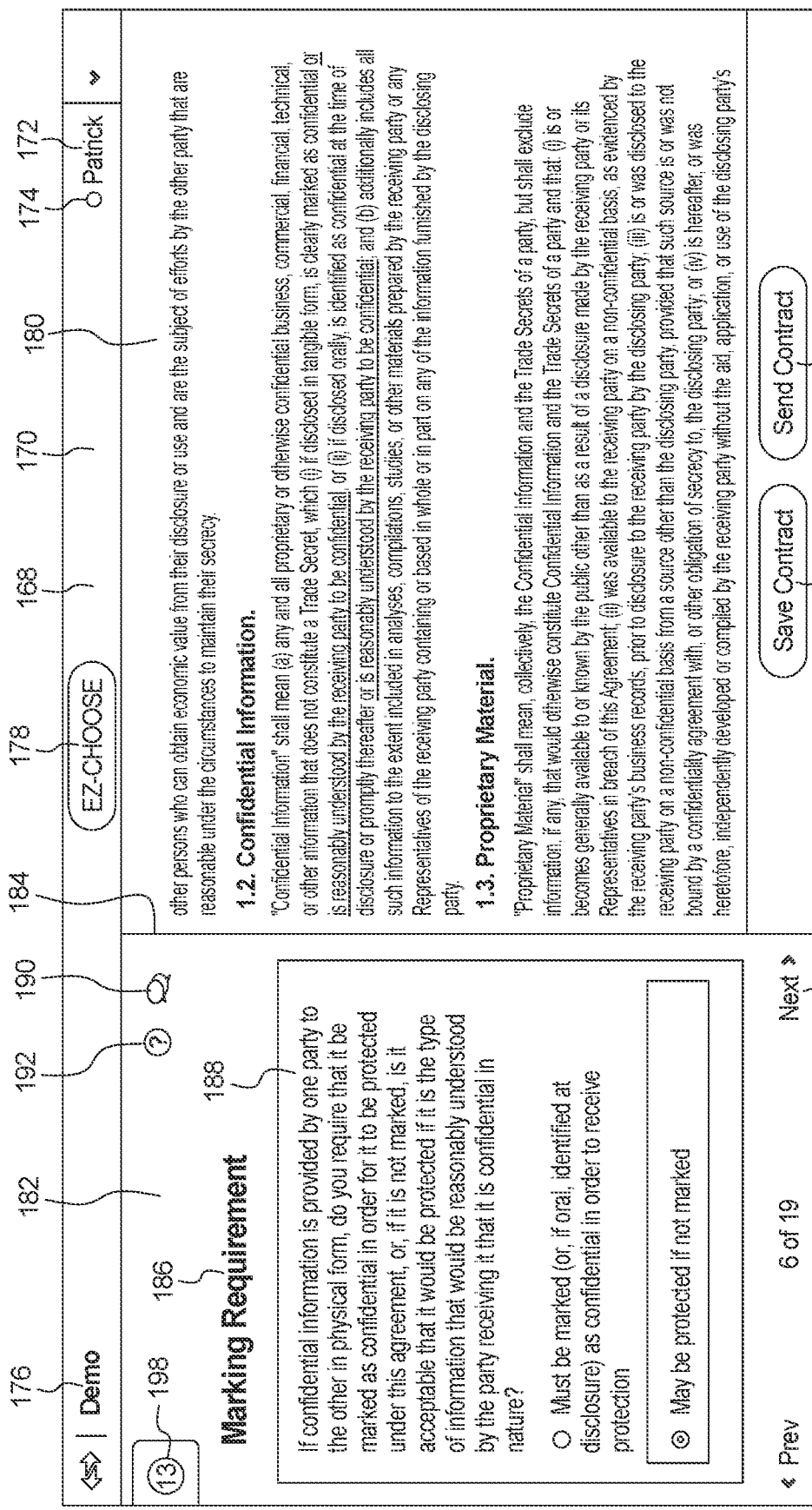
FIG. 10 is another example of an initiating party legal build screen in a GUI of an embodiment of the contract negotiation and drafting system shown in FIG. 1.

FIGS. 9 and 10 show examples of the legal issue input tool 188 requesting the initiating party to select one option from multiple choices. As shown, the plain language or business language description of the issue is provided in the legal issue input tool 188. Based on the initiating user's selection, the formal legal language in the in-progress contract window 180 is updated in real-time. The language that in inserted/edited/modified as a result of the initiating user's selection in the legal issue input tool 188 is highlighted in the user's color within the in-progress contract window 180. This makes it very easy for the initiating party to see exactly how the contract is dependent on the answers given in the legal issue input tool 188.

Figure 11:
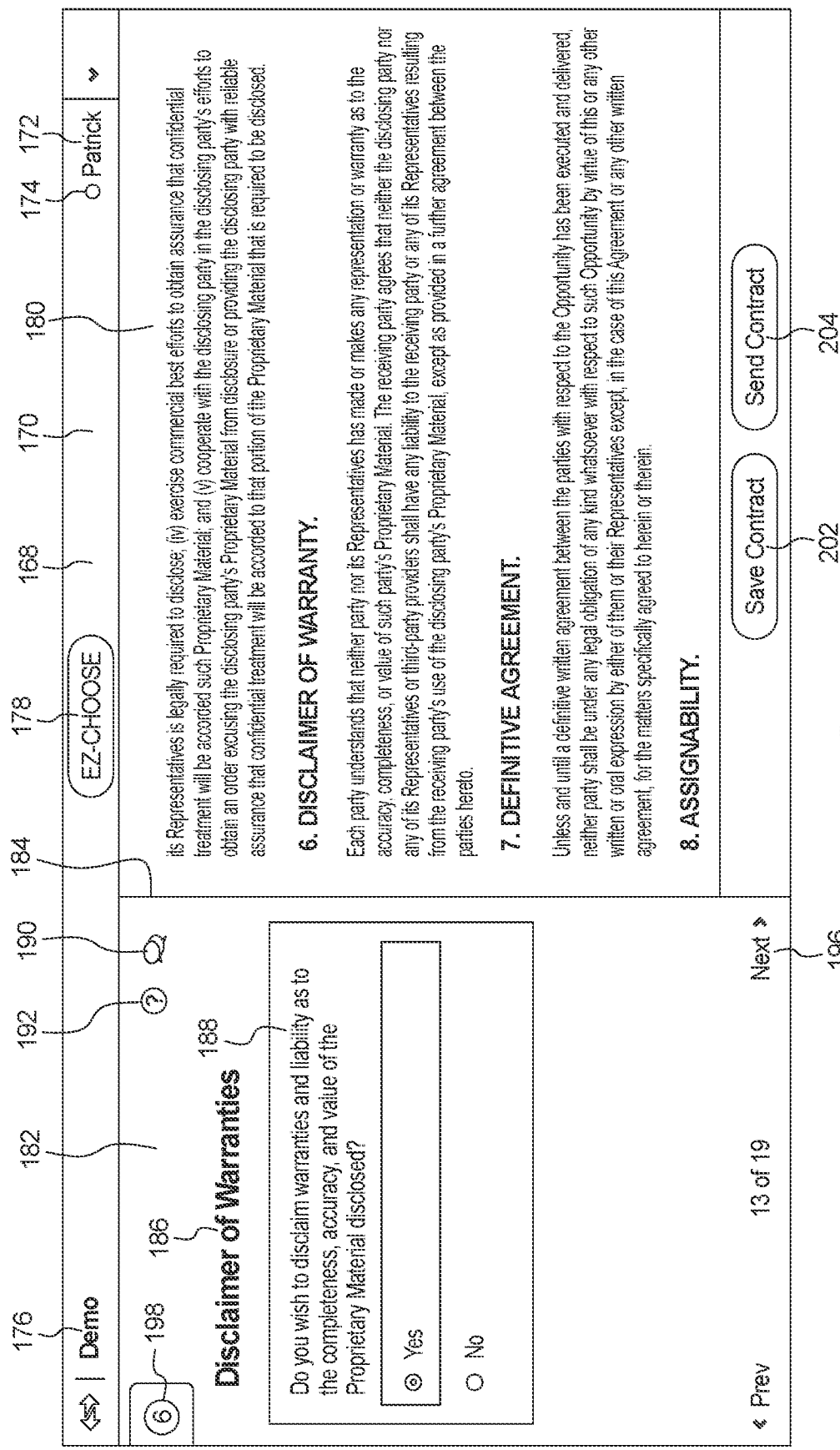
FIG. 11 is another example of an initiating party legal build screen in a GUI of an embodiment of the contract negotiation and drafting system shown in FIG. 1.

FIG. 11 shows and example of the input to the legal issue input tool 188 creating and inserting an entire new section into the contract in the in-progress contract window 180. In the example shown, the initiating party is asked whether he or she wishes to disclaim warranties and liability as to the completeness, accuracy, and value of the proprietary material disclosed. Because the initiating party answers yes, new section "6. DISCLAIMER OF WARRANTY" is added to the contract in the in-progress contract window 180 and each of the subsequent heading numbers in the contract are updated. Had the initiating party answered no, the disclaimer of warranty section would not be added to the contract and the "Definitive Agreement" section would be numbered as section 6.

In each of FIGS. 7-11, there is a counter 198 showing the current number of headings 186 for which the user is required to provide input through the legal issue input tool 188 (i.e., the number of open issues). As shown in FIG. 12, upon answering the final query, the legal issue window 182 changes to a summary view window 200. In the summary view window 200, each question that was posed to the initiating party is listed, along with the answer the initiating party provided, and each is highlighted in the user's color. The questions and answers are all in one, scrollable list within the summary view window 200, with the options to: save the contact 202, send the contract to the receiving party 204, save the contact as a template 206, and end negotiations 208. It is contemplated that these actionable options may be available at the bottom of the GUI regardless of where the user is in the process. In the embodiment shown in FIG. 12, the in-progress contract window 180 remains in sight while the initiating party interacts with the summary view window 200 and scrolls in coordination with the initiating party's position within the summary view window 200. Once the initiating party is satisfied with the selections, the user may save the draft and sends it to the receiving party.

Figure 13:
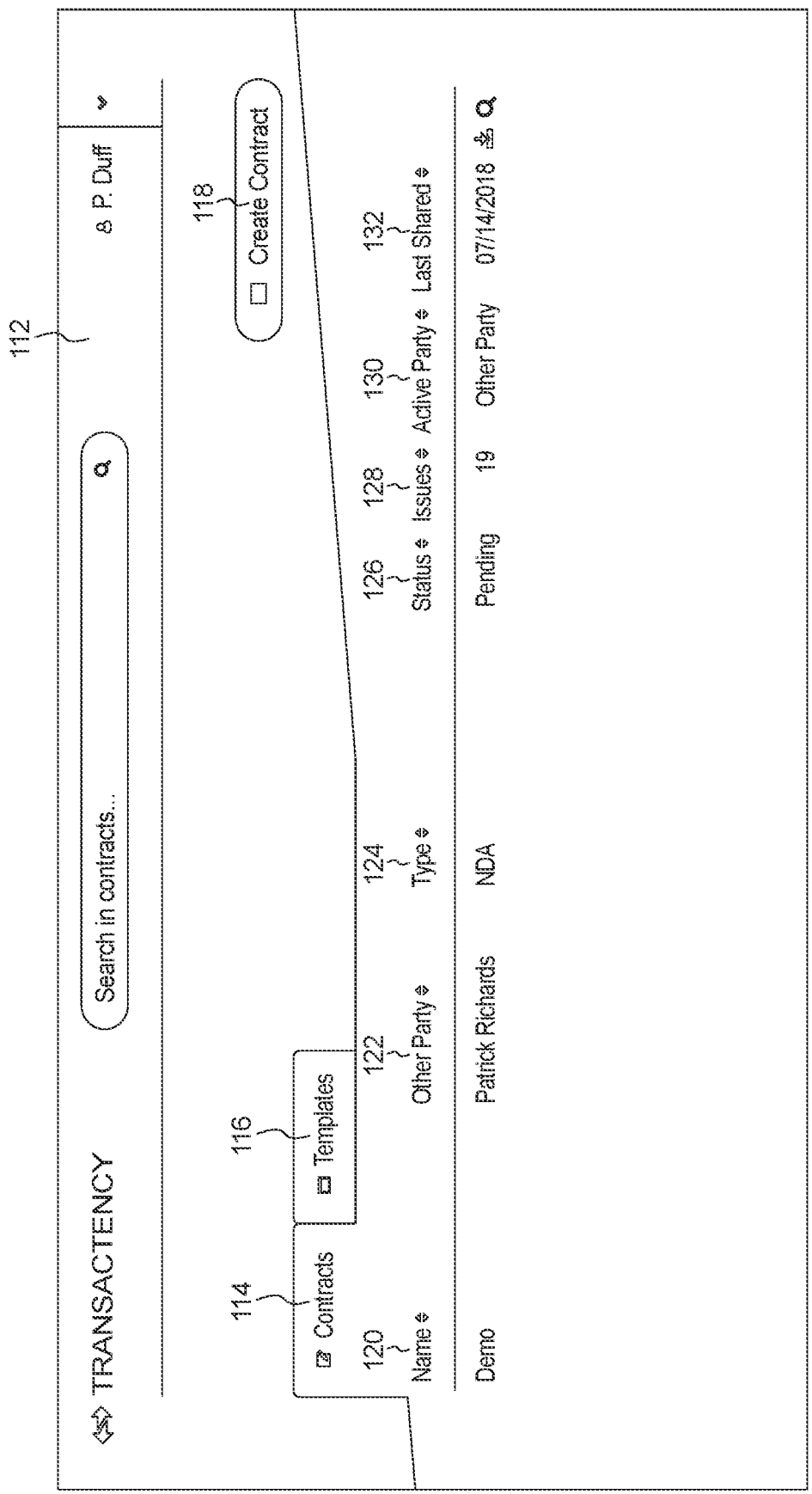
FIG. 13 is an example of a dashboard of a receiving party provided in a GUI of an embodiment of the contract negotiation and drafting system shown in FIG. 1.

Turning to FIG. 13, an example of the receiving party's dashboard 112 is shown. Just as shown in FIG. 2, the dashboard 112 in FIG. 13 includes the contacts tab 114 and the templates tab 116. The dashboard 112 also includes the create the new contract 118. As shown, the contract described above is now listed in the dashboard 112 and accessible when the contracts tab 114 is selected. In the example shown, the listing of the contracts provides the name of the contract 120 ("Demo"), the name of the other party 122 ("Patrick Richards"), the type of agreement 124 ("NDA"), the status of the agreement 126 ("Pending"), the number of outstanding issues in the agreement 128 ("19"), identification of the active party 130 ("Other Party"), and the date an update to the agreement was last shared between the parties 132 ("Jul. 14, 2018").

When the receiving party selects a contract to review from the dashboard 112, the user is taken to the detail view screen 210. The detail view screen mode 210 is very similar to the initiating party legal build screen 168, with a couple of key differences. For example, in the example shown in FIG. 14, the detail view screen 210 includes a banner 170, the upper right corner of which identifies the user by name 172 and indicates the user's associated color 174 (e.g., green). In the upper left corner of the banner 170, the particular contract is identified by name 176 (e.g., Demo). In the center of the banner, distinguishing the detail view screen 210 from the initiating party legal build screen 168, is an "EZ-AGREE" button 212, the function of which is described in greater detail herein. Below the banner 170, the screen 210 is split in two vertically divided windows, the in-progress contract window 180 and the legal issue window 182. In the example shown in FIG. 14, the margin 184 between the in-progress contract window 180 and the legal issue window 182 may be dragged left or right to increase one side of the screen 210 and correspondingly shrink the other.

As further shown in FIG. 14, the in-progress contract window 180 is on the right side of the detail view screen 210. The receiving party may scroll through the contract to see the language of the contract as it exists.

Above and to the right of the heading 186 is a notation icon 190. When a user selects the notation icon 190, a box opens inviting the user to provide comments or other communications the user would like to make to the other party relating to the issue at hand (see FIGS. 17-19). Upon providing any comments, the user is advised that the time-stamped comment will be provided to the other party.

Adjacent the notation icon 190 is an additional information icon 192 for the initiating party to obtain additional information about the specific issue at hand. When a user selects the additional information icon 192, a pop-up window opens containing further information about the subject—e.g., an explanation of why this item is a negotiable issue and what the issue means in plain-language.

Additionally, adjacent to the notation icon 190 is a history button 214. The receiving party can select the history button 214 to display the history of the parties' respective positions on the issue by listing, in time-stamped, chronological format, the choices selected and highlighted using the color of the party that made each selection (see FIG. 20).

Like the initiating party legal build screen 168, in the legal issue window 182 on the left side of the detail view screen 210 is a heading 186 identifying the subject matter of the current issue in front of the receiving party. Below the heading 186 is a legal issue input tool 188 through which the receiving user provides one or more answers to input requests from the system 100. Unlike in the initiating party legal build screen 168, in the detail view screen 210 the receiving party is shown the currently-selected input provided by the initiating user in the initiating party legal build screen 168. The receiving party is able to then accept or counter each input made by the initiating party.

The legal issue input tool 188 displays the options that were provided to the initiating party: if it was a question that required a freeform response, the initiating party's response is included as well as space to type an alternative response; if it was a yes/no question, buttons for each of "yes" and "no" are shown; if it was multiple choice; buttons and corresponding language describing the various options are provided; if it was a question where the initiating party could choose some or all of the options, boxes to check and corresponding language describing the various options are included. The initiating party's choice is identified and highlighted in the associated color (blue).

There are several key actions the receiving party can take from the detail view screen 210 shown in FIG. 14. For example: (1) the receiving party can select the additional information icon 192, which will cause a box to open on the page containing further information about the subject—e.g., an explanation of why this item is a negotiable issue; (2) the receiving party can select the history button 214, which will display the history of the parties' respective positions on the issue by listing, in time-stamped, chronological format, the choices selected and highlighted using the color of the party that made the selection; (3) the receiving party can select the notation icon 190, and a box opens inviting the receiving party to type in comments or other communications the receiving party would like to make to the initiating party (upon typing in information, the receiving party may select the "save comment" button, upon which time the comment disappears, the receiving party is advised that the comment will be provided to the initiating party, and the comment is time-stamped); and (4) the receiving party can choose an alternative answer to that provided by the initiating party (or, if the query requires a typewritten response, provide a different response) through the legal issue input tool 188; if this is done, the receiving party's alternative choice is highlighted in the receiving party's color (green), the in-progress contract window 180 immediately scrolls to the area of the contract that relates to the query, and the legal language corresponding to the input provided is generated and highlighted with the color associated to the party (e.g., green)—the receiving party may, on the same screen and without proceeding further, provide alternative input (e.g., select a different choice in response to the query); the legal language corresponding to the input provided is simultaneously generated and highlighted with the color associated to the receiving party (e.g., green) in the in-progress contract window 180 and the receiving party can do this as many times as desired—that is, the legal language that is associated with the choice can be reviewed in every instance (though the receiving party can simply rely upon the high-level description set forth on the left side of the screen).

The receiving party can review and react to each of the open issues as described above either by selecting the next button 196 at the bottom of the legal issue input tool 188 to move sequentially through the open issues, by using the links in the summary view (described further herein), or simply by scrolling through the agreement in the in-progress contract window 180.

In FIG. 14, the counter 198 shows that there are currently nineteen headings 186 for which the user is required to provide input through the legal issue input tool 188 (i.e., the number of open legal issues). For each legal issue the receiving party reviews and does not offer a counteroffer, the counter 198 decreases. For each issue the receiving party offers a counteroffer, the counter 198 stays the same. For example, in FIG. 14, the legal issue input tool 188 is requesting the receiving party to confirm or provide alternative information regarding the initiating party's information.

One more distinction between the initiating party legal build screen 168 and the detail view screen 210 is the sign contract button 216 at the bottom of the in-progress contract window 180. At any point in the review process in which the receiving party has not offered a counteroffer to any of the legal issues, the receiving user may select the sign contract button 216 to accept the current version of the proposed agreement. As soon as a single counteroffer is provided, the sign contract button 216 disappears and the in-progress contract window 180 displays the save contract 202 and send contract 204 options.

When the receiving user either accepts the current state of a given issue or provides alternative details through the legal issue input tool 188, the receiving user can select the next button 196 at the bottom of the legal issue input tool 188 and, upon doing so, the legal issue window 182 moves to the next query and updates the heading 186 and the legal issue input tool 188.

Figure 15:
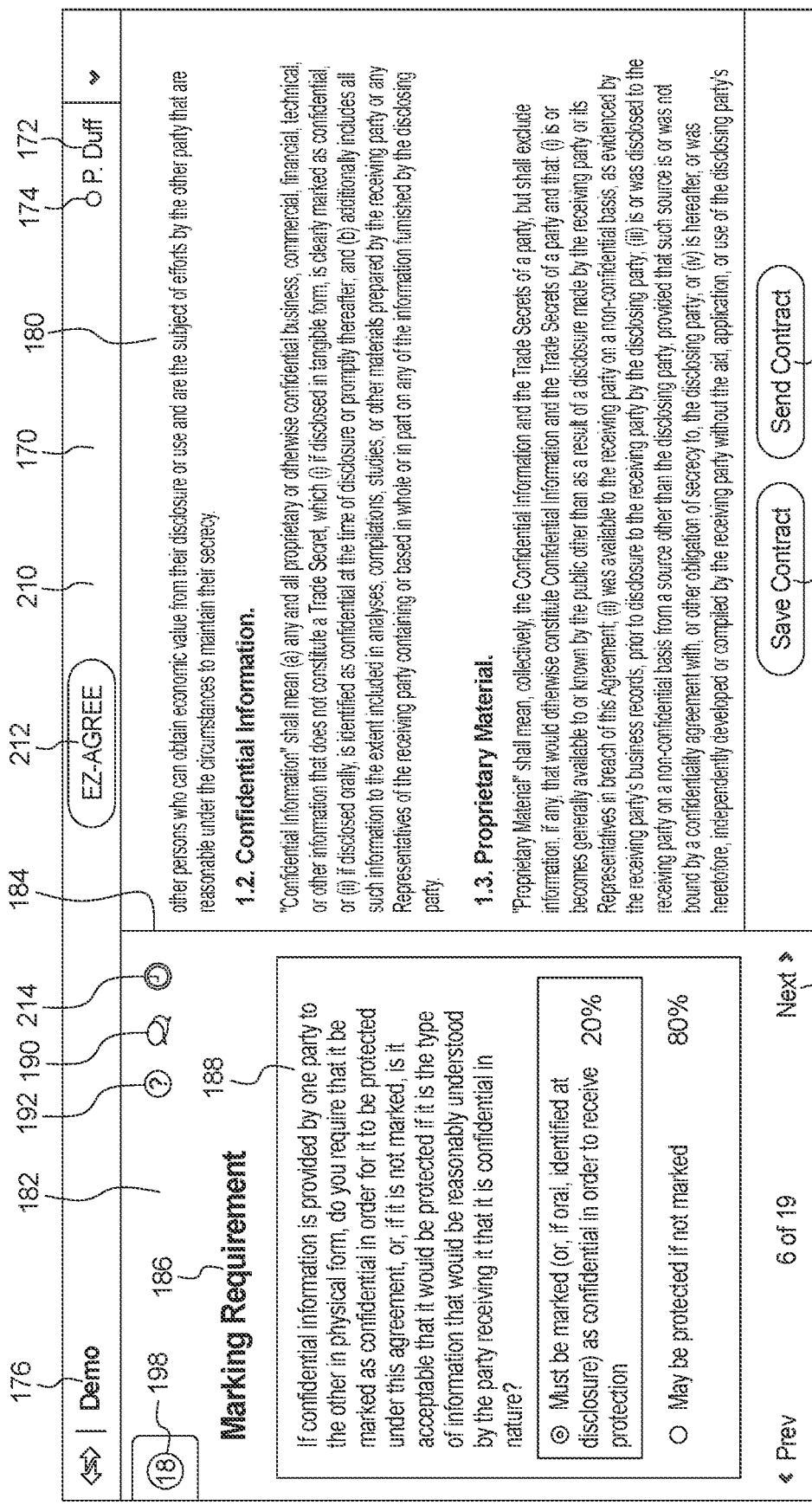
FIG. 15. is another example of a receiving party detail view screen in a GUI of an embodiment of the contract negotiation and drafting system shown in FIG. 1.

As shown in FIG. 15, after the receiving user has accepted the initiating party information in the legal issue input tool 188 without providing alternative information, the counter 198 reduces from nineteen to eighteen, showing that the contract is one issue closer to agreement.

In the example provided in FIG. 10, the initiating party choose that, for the marking requirement section of the contract, that the confidential information may be protected if not marked. In the example provided in FIG. 15, the receiving party makes the selection that the confidential information must be marked (or, if oral, identified at disclosure) as confidential in order to receive protection, thus updating the confidential information section in the in-progress contract window 180 to remove the language "or is reasonably understood by the receiving party to be confidential" in the two instances in which it previously appeared. In doing so, the receiving party's selection in the legal issue input tool 188 (e.g., must be marked (or, if oral, identified at disclosure) as confidential in order to receive protection) is marked in the receiving party's color, e.g., green.

When the receiving party has completed his or her review of the contract, the receiving party either has made no changes and can select the sign contract button 216 or has made changes and can select either or both of the save contract 202 and send contract 204 options. If saving the contract, the updates are stored in the system 100, but the initiating party is not informed of the updates. If sending the contract, the initiating party is informed of the updates and given control of the document to review and revise in the detail view screen 210. The process iterates between the initiating party and the receiving party until the contract is (a) completed and electronically signed or (b) abandoned.

Figure 16:
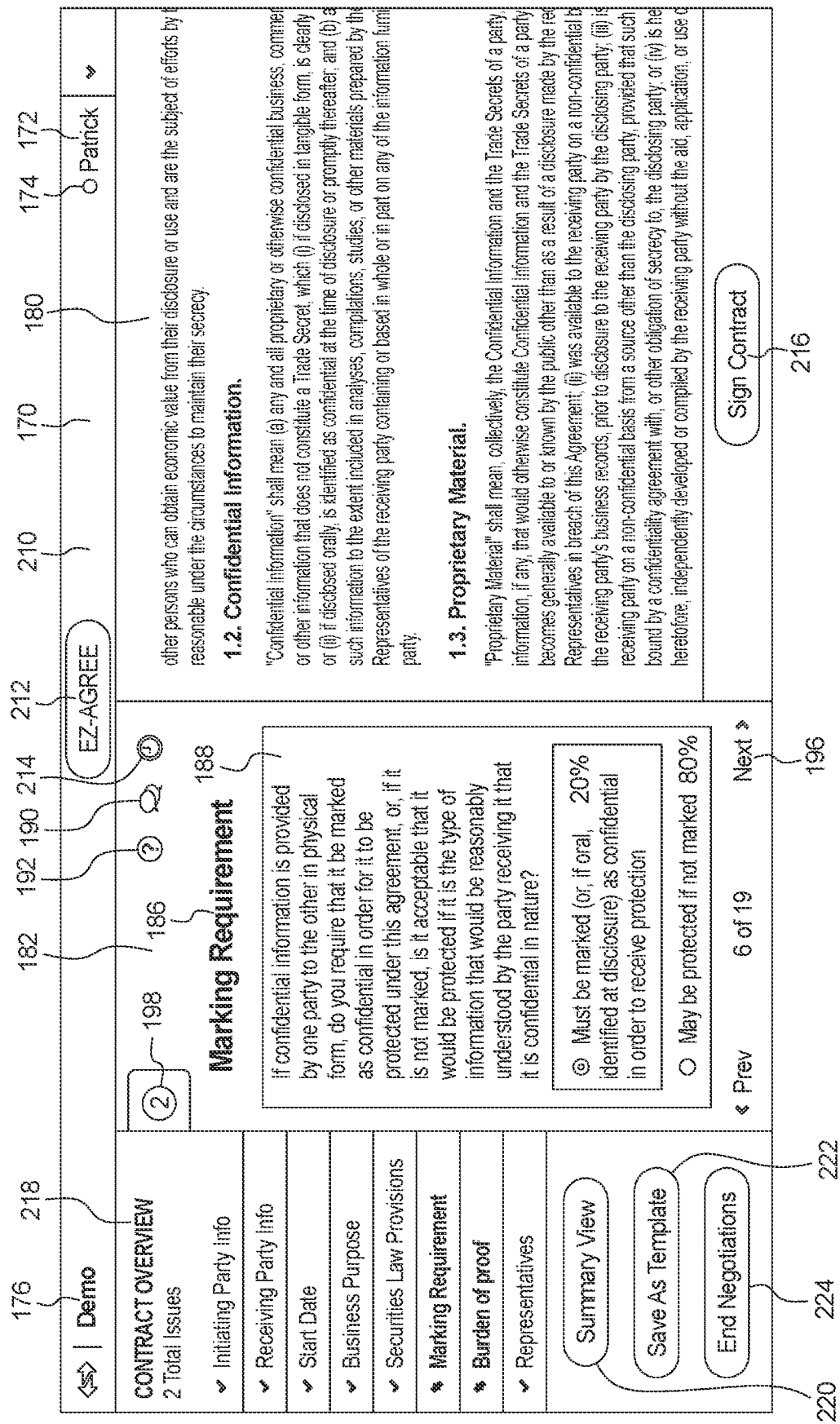
FIG. 16 is an example of a receiving party contract overview screen within a detail view screen in a GUI of an embodiment of the contract negotiation and drafting system shown in FIG. 1.

Turning now to FIG. 16, an example of the contract is shown in which the receiving party has responded to the initial draft of the agreement by making two counter-offers, a change in the marking requirement section and a change to the burden of proof section. The two outstanding issues are indicated by the number two shown in the counter 198 in the initiating party's detail view screen 210.

As shown in FIG. 16, when a party selects the counter 198, a contract overview screen 218 is presented to the user. The contract overview screen 218 indicates to the party how many areas of the contract include require review before approval, indicated as "total issues." In this example, there are two total issues: (1) the marking requirement; and (2) the burden of proof. In the list of issues shown in the contract overview screen 218, legal issues that have been agreed to are indicated with checkmarks and legal issues for which agreement has not yet been reached are indicated with opposite pointing arrows. Each of the issues listed in the contract overview screen 218 are hyperlinks to their respective section of the agreement. If the party wants to jump directly to an issue in the contract (as opposed to scrolling through the contract), the party can simply click the issue in the contract overview screen 218 and the in-progress contract window 180 and the legal issue window 182 will display the portion of the contract corresponding to the respective issue.

There are three options provided at the bottom of the contract overview screen 218, a summary view button 220, a save as template button 222, and an end negotiations button 224. The summary view button 220 takes the party to a summary view screen in which the party views the agreement similar to one would view a term sheet, with just the questions and the answers for the current draft of the agreement. The save as template button 222 saves the current version of the agreement as a new template in the system 100 to be accessible through the user's dashboard 112. Selection of the end negotiations button 224 causes each of the following to occur: (1) the system generates a report, in .pdf format, that includes the following information: (a) the original choices and inputs of the initiating party; (b) a list of points of agreement (i.e., closed issues) and the history of the parties positions during negotiations, including all comments/communications regarding same; and (c) a list of points of disagreement (i.e., open issues) and the history of the parties positions during negotiations, including all comments/communications regarding same; (2) the system generates a text document that includes the contract as completed when containing all of the closed issues and for those sections of the contract that are open issues at the time of abandonment, language corresponding to the most recent selection of a party is included, is highlighted in that party's color, and is physically marked with "[OPEN]" at the beginning of the first paragraph of the open section; and (3) the open session may be marked as "aborted" on the dashboard 112.

Additionally, the contract overview screen 218 (or the detail view screen 210 more generally) may include a live discussion button, through which the user can initiate a request for a telephone or video conference with the other party to discuss matters—likely, the remaining open issues in the contract. Selecting this feature causes the system to do the following: (1) generate a report, in .pdf format, that identifies each section of the agreement upon which there is not yet agreement (i.e., the open issues)— for each issue the report will provide: (a) the question originally posed to the initiating party when building the contract, options as to answers the initiating party could have chosen, and the history (if any) of the positions taken by the parties, in time-stamped and highlighted format; (b) a record of any communications (i.e., comments) made by the parties as to the issue, in time-stamped format; (c) any explanation provided by the system as to the section (i.e., the text that would be shown if a party selected the "Learn More" hypertext link); and (d) a blank section where a party can provide notes (either electronically or, if the report is printed out, via handwriting); (2) open a dialogue box in which the party can type a message to the other party regarding the request for a live interaction—for instance, the requester might indicate that he or she thinks the parties are close to resolution, and would like to get on a call at 2:30 pm on May 23rd to discuss same (in an alternative embodiment, the system may trigger an automatic calendaring process, e.g., send a meeting invite in Outlook); and (3) upon selecting "Send" on the dialogue box, the system generates an email to the other party in which it includes the text inserted in the dialogue box, and to which it attaches the open issues report. The parties may thereafter participate in direct communications with respect to the open issues via the system or by other means.

Figure 17:
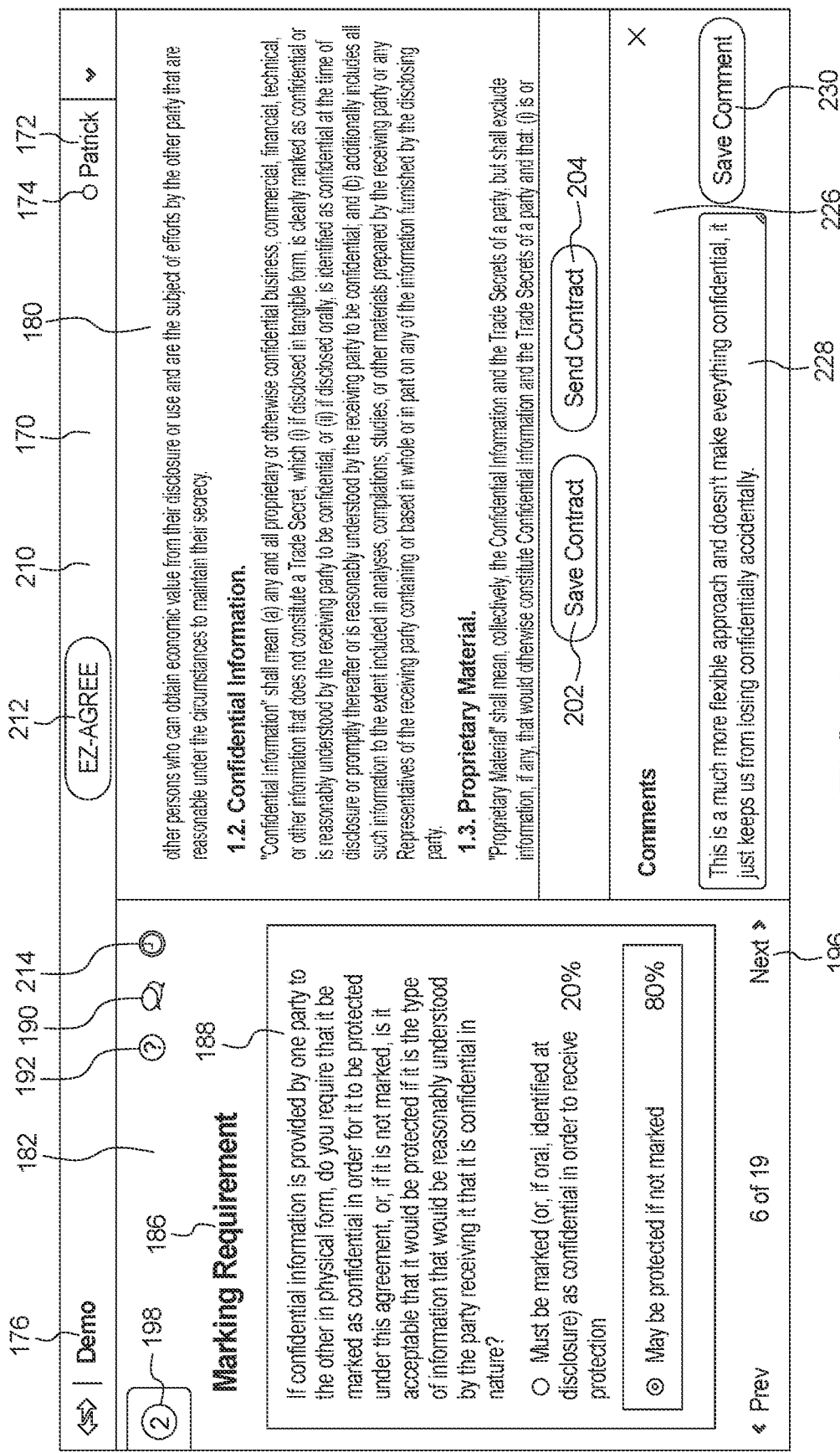
FIG. 17 is an example of an initiating party detail view screen in a GUI of an embodiment of the contract negotiation and drafting system shown in FIG. 1.
Figure 18:
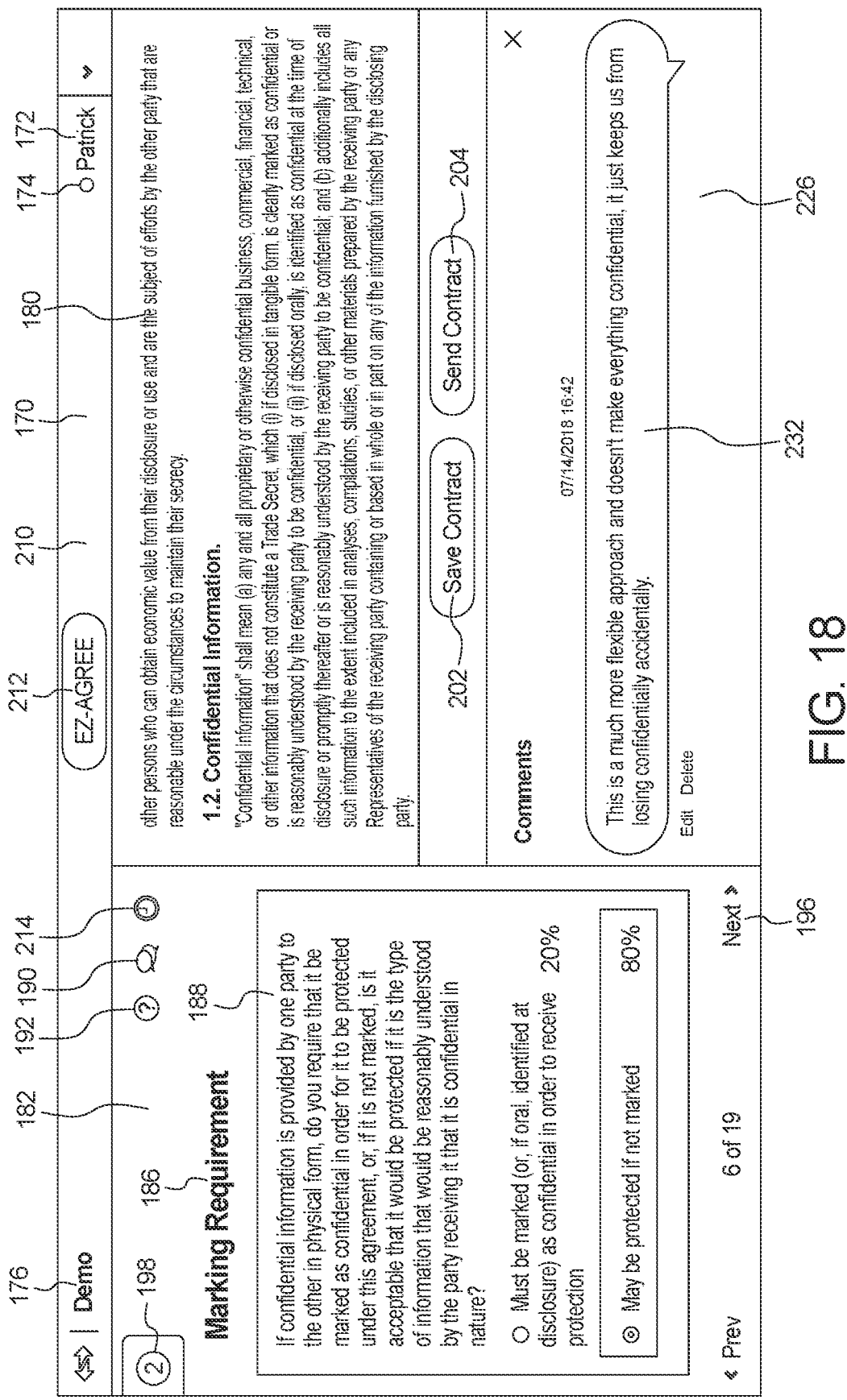
FIG. 18 is another example of an initiating party detail view screen in a GUI of an embodiment of the contract negotiation and drafting system shown in FIG. 1.
Figure 19:
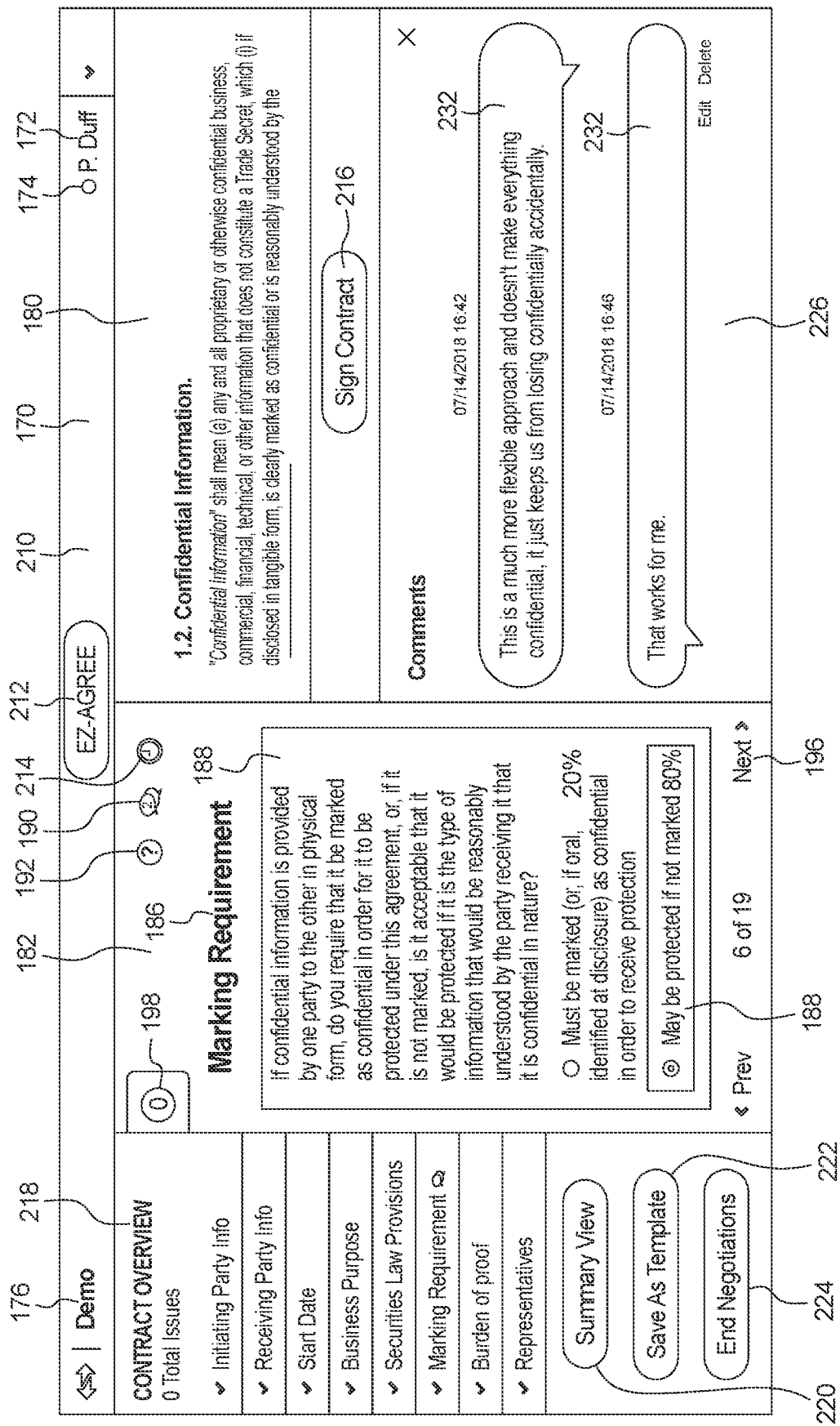
FIG. 19 is another example of a receiving party detail view screen in a GUI of an embodiment of the contract negotiation and drafting system shown in FIG. 1.

FIGS. 17-19 illustrate the comments functions access through use of the notation icon 190. As shown in FIG. 17, the initiating party may use the notation icon 190 to open a comment screen 226 including a comment box 228 into which the user can provide free form text and a save comment button 230 that saves the text in the comment box 228 to be shared with the other party. As shown in FIG. 18, once the text in the comment box 228 is saved, it is dated and time stamped and provided in a comment bubble 232. Then, as shown in FIG. 19, the receiving party can save a comment as well to be displayed in the comment screen 226. As shown in FIG. 19, the number of comments is provided within the notation icon 190.

Figure 20:
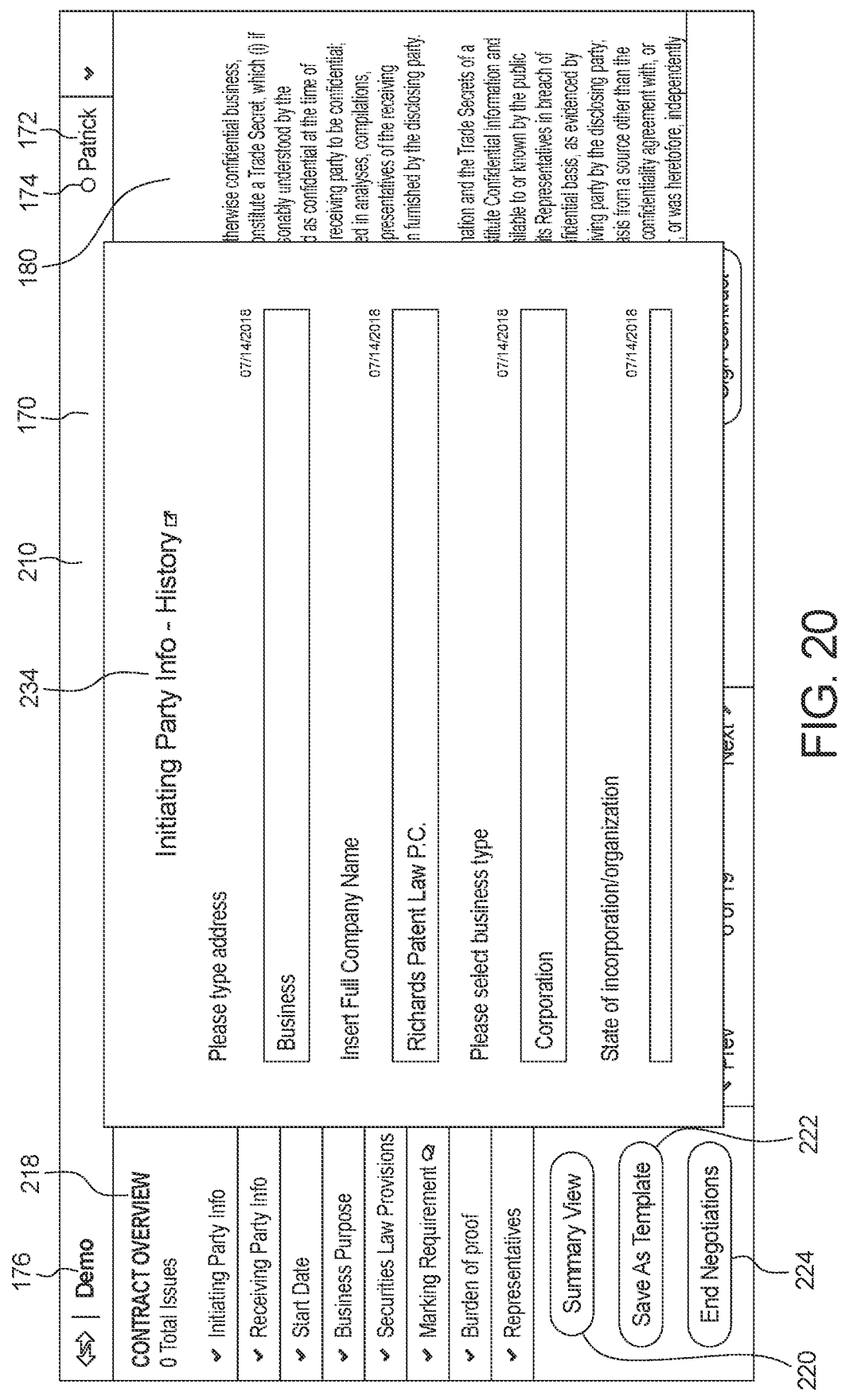

Turning now to FIG. 20, selection of the history button 214 displays the history of the parties' respective positions on the issue by listing, in time-stamped, chronological format, the choices selected and highlighted using the color of the party that made each selection in a history screen 234.

FIG. 21 shows a dashboard 112 in which there are no more outstanding issues, accordingly there is no active party, and the status of the contract is shown as awaiting pdf. The dashboard 112 in FIG. 21 is representative of a completed contract in which either party can go back to view the executed agreement, but can no longer negotiate the terms.

As shown, the system 100 is capable of collecting a significant amount of data from each user and from each interaction with an agreement. As such, it is contemplated that many meaningful statistics can be derived from aggregated and anonymized data acquired through the system 100 that may be very useful in benchmarking and understanding the market standard terms for various agreements. For example, it may be very valuable to aggregate and anonymize the legal selections ultimately chosen by the parties in the agreements that are executed, thereby giving greater insight into how common each potential contract term may be.

In one embodiment of the system 100, provided there is a statistically significant pool of data for a given issue, when a user is in the initiating party legal build screen 168 or the detail view screen 210, and where the data input option is yes/no, multiple choice, or choose from many, a notation will be provided adjacent to each of the options offered indicating the percentage of time parties ultimately selected each option. This data is automatically updated with each new transaction that is consummated through the system. The statistics may be more granular as well, for example, in a lease indicating the percentage of time a term is proposed by a landlord vs. proposed by a tenant. The statistics may also include trend analysis, such that in addition to providing the percentage of times a given term is used, the statistics may indicate whether the term is being agreed to more or less frequently in recent transactions. The system may keep and analyze other data as well; for instance, how many times a user interacts, total time from initiation to signature, etc.

An example of such statistics displayed in the system is shown in FIGS. 15-19, in which the system 100 has determined that 20% of the time parties agree to "must be marked (or, if oral, identified at disclosure) as confidential in order to receive protection" and 80% of the time parties agree to "may be protected if not marked" and had marked each option accordingly.

As shown in FIGS. 7-12, the initiating party legal build screen 168 includes an EZ-CHOOSE button 178. If the initiating party selects the EZ-CHOOSE button 178, then, for those queries for which there are statistics pertaining to usage (i.e., yes/no, multiple choice, choose from many options) the system 100 automatically populates the contract with the statistically most common choice for each of the queries, thereby enabling the initiating party, through a single user action, to select each of the most commonly agreed to contract terms that are available. The initiating party may then be directed to answer the queries that do not have statistical information (i.e., write-ins), resulting in a far shorter list of items to address (or, perhaps, none, if all of the queries are multiple choice, etc.).

It is contemplated that the EZ-CHOOSE button 178 functionality may be fine-tuned for a particular user. For example, in a landlord/tenant negotiation there may be options to use the EZ-CHOOSE button 178 to populate the contract with the terms most commonly chosen by other parties on the same side of the transaction as the given user. In another example, a user may be provided an interface through which the contact issues can be selectably included or excluded from the EZ-CHOOSE function, such that the execution of the EZ-CHOOSE function only affects those contract terms explicitly included in the function or specifically does not affect the contracts terms that are explicitly excluded from the function.

Similarly, as shown in FIGS. 14-19, the detail view screen 210 includes an EZ-AGREE button 212. When the user selects the "EZ-AGREE" button 212, for those queries for which there are statistics pertaining to usage (i.e., yes/no, multiple choice, choose from many options), and where the initiating party has chosen the statistically most common choice, the system 100 automatically treats the receiving party as having accepted the initiating party's selection and those particular sections will have the initiating party's highlighting removed from them, and will be correspondingly removed from the counter 198.

The detail view screen 210 may then show as highlighted (and in the open issues list) only those sections that do not have statistical information (i.e., write-ins) and those areas where the initiating party did not choose the statistically most common choice, resulting in a far shorter list if items to address (or, perhaps, none, if all of the queries are multiple choice and the initiating party used EZ-CHOOSE, etc.).

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A contract negotiation and drafting system comprising:
one or more user devices;
a controller in communication with the one or more user devices;
a memory coupled to the controller, wherein the memory is configured to store program instructions executable by the controller;
wherein in response to executing the program instructions, the controller is configured to:
provide a first graphical user interface accessible through a first user account representative of a first party accessible through the one or more user devices through which a first user selects a contract template and is simultaneously presented a contract window and a legal issue window, wherein the contract window displays the contract template between the first party and a second party and the legal issue window displays a legal issue input tool through which the first user provides input through the one or more user devices for each of a plurality of predefined legal issue in the contract template, wherein at least one of the inputs provided by the first user is a selection of a first selected option from a predefined set of text-based multiple choice options;
in response to the selection of the first selected option, update contract text in the contract template in the contract window of the first graphical user interface, wherein the updated contract text is the formal legal language of a contract text element associated with the first selected option, thereby simultaneously showing the predefined set of text-based multiple choice options and the first selected option in the legal issue window and the formal legal language of the contract text element associated with the first selected option in the contract window;
provide a second graphical user interface accessible through a second user account representative of the second party accessible through the one or more user devices through which a second user is simultaneously presented the contract window and the legal issue window, wherein the contract window displays the updated contract template and the legal issue window displays the inputs provided by the first user, the first selected option and the predefined set of text-based multiple choice options.

2. The system of claim 1 wherein the update of the contract text in the contract window of the first graphical user interface includes highlighting the updated contract text in a color assigned to the first user.

3. The system of claim 1 wherein the update of the contract text in the contract window of the first graphical user interface includes highlighting the updated contract text in a color assigned to the second user.

4. The system of claim 1 wherein the update of the contract text in the contract window of the first graphical user interface includes adding a new section to the contract.

5. The system of claim 1 wherein the update of the contract text in the contract window of the first graphical user interface includes removing a section from the contract.

6. The system of claim 1 wherein the first graphical user interface and the second graphical user interface each include a counter displaying a number of the plurality of predefined legal issues for which an agreement between the first party and the second party has yet to be reached.

7. The system of claim 1 wherein the first graphical user interface and the second graphical user interface each include a contract overview window including a list including the each of the plurality of predefined legal issues and an identification of whether agreement has been reached for each of the plurality of predefined legal issues.

8. The system of claim 1 wherein the memory includes statistics derived from data from a plurality of negotiated contract templates for which agreement has been reached by the first party and the second party, the statistics including an identification of a most commonly agreed multiple choice option in the predefined set of text-based multiple choice options.

9. The system of claim 8 wherein the first graphical user interface includes a first selection tool, the execution of which automatically chooses, in lieu of the legal issue input tool, the input of the first user for each of a plurality of predefined legal issues for which the statistics include an identification of the most commonly agreed multiple choice option in the predefined set of text-based multiple choice options.

10. The system of claim 8 wherein the first graphical user interface and the second graphical user interface each include a second selection tool, the execution of which automatically agrees to each of the plurality of predefined legal issues for which an agreement between the first party and the second party has yet to be reached for which a current selection is the input identified by the statistics as the most commonly agreed multiple choice option in the predefined set of text-based multiple choice options.

11. A method of contract negotiation and drafting in a system in which a controller is in communication with one or more user devices, wherein the controller is also in communication with memory coupled to the controller, wherein the memory stores program instructions executable by the controller, the method comprising the steps of, in response to the execution of the program instructions:

providing a first graphical user interface accessible through a first user account representative of a first party accessible through the one or more user devices through which a first user selects a contract template and is presented a contract window and a legal issue window, wherein the contract window displays the contract template between the first party and a second party and the legal issue window displays a legal issue input tool through which the first user provides input through the one or more user devices for each of a plurality of predefined legal issue in the contract template, wherein at least one of the inputs provided by the first user for the predefined legal issue is a selection of a first selected option from the predefined set of text-based multiple choice options;

in response to the selection of the first selected option, updating contract text in the contract template in the contract window of the first graphical user interface, wherein the updated contract text is the formal legal language of the contract text element associated with the first selected option, thereby simultaneously showing the predefined set of text-based multiple choice options and the first selected option in the legal issue window and the formal legal language of the contract text element associated with the first selected option in the contract window; and providing a second graphical user interface accessible through a second user account representative of the second party accessible through the one or more user devices through which a second user is presented the contract window and the legal issue window, wherein the contract window displays the updated contract template and the legal issue window displays the inputs provided by the first user the first selected option and the predefined set of text-based multiple choice options.

12. The method of claim 11 wherein the first graphical user interface and the second graphical user interface each include a counter displaying a number of the plurality of predefined legal issues for which an agreement between the first party and the second party has yet to be reached.

13. The method of claim 11 wherein the memory includes statistics derived from data from a plurality of negotiated contract templates for which agreement has been reached by two parties, the statistics including an identification of a most commonly agreed multiple choice option in the predefined set of text-based multiple choice options.

14. The method of claim 13 wherein the first graphical user interface includes a first selection tool, the execution of which automatically chooses, in lieu of the legal issue input tool, the input of the first user for each of a plurality of predefined legal issues for which the statistics include an identification of the most commonly agreed multiple choice option in the predefined set of text-based multiple choice options.

15. The method of claim 13 wherein the first graphical user interface and the second graphical user interface each include a second selection tool, the execution of which automatically agrees to the plurality of predefined legal issues legal issues for which an agreement between the first party and the second party has yet to be reached for which a current selection is the input identified by the statistics as the most commonly agreed multiple choice option in the predefined set of text-based multiple choice options.

\* \* \* \* \*